(12) United States Patent
Noh et al.

(10) Patent No.: US 9,900,924 B2
(45) Date of Patent: Feb. 20, 2018

(54) METHOD AND APPARATUS FOR CARRIER AGGREGATION

(71) Applicant: KT CORPORATION, Gyeonggi-do (KR)

(72) Inventors: Minseok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 134 days.

(21) Appl. No.: 14/897,233

(22) PCT Filed: Jul. 23, 2014

(86) PCT No.: PCT/KR2014/006704
§ 371 (c)(1),
(2) Date: Dec. 9, 2015

(87) PCT Pub. No.: WO2015/012593
PCT Pub. Date: Jan. 29, 2015

(65) Prior Publication Data
US 2016/0150585 A1    May 26, 2016

(30) Foreign Application Priority Data

Jul. 26, 2013 (KR) .................. 10-2013-0088899
Oct. 21, 2013 (KR) .................. 10-2013-0125615
Jan. 21, 2014 (KR) .................. 10-2014-0007158
Feb. 10, 2014 (KR) .................. 10-2014-0015093

(51) Int. Cl.
*H04W 72/04* (2009.01)
*H04W 76/02* (2009.01)

(52) U.S. Cl.
CPC ..... *H04W 76/025* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 8,462,688 B1 | 6/2013 | Dinan | |
| 8,526,310 B2 | 9/2013 | Dinan | |
| 8,526,389 B2 | 9/2013 | Dinan | |
| 8,531,966 B1 | 9/2013 | Dinan | |
| 8,537,739 B1 | 9/2013 | Dinan | |
| 8,542,654 B1 | 9/2013 | Dinan | |
| 8,547,929 B1 | 10/2013 | Dinan | |
| 8,553,558 B1 | 10/2013 | Dinan | |

(Continued)

FOREIGN PATENT DOCUMENTS

| KR | 10-2008-0081699 A | 9/2008 |
|---|---|---|
| KR | 10-2010-0050575 A | 5/2010 |
| KR | 10-2012-0085833 A | 8/2012 |

*Primary Examiner* — Chi H Pham
*Assistant Examiner* — Soon-Dong D Hyun
(74) *Attorney, Agent, or Firm* — IP Legal Services, LLC

(57) ABSTRACT

The present disclosure relates to a method and an apparatus for performing carrier aggregation. The method includes the steps of: receiving an index of one or more secondary cells controlled by a first base station, and an index of one or more secondary cells controlled by a second base station; and performing the function of a primary cell by using one secondary cell from among the secondary cells of the second base station.

12 Claims, 25 Drawing Sheets

(56) References Cited

U.S. PATENT DOCUMENTS

| | | |
|---|---|---|
| 8,553,655 B1 | 10/2013 | Dinan |
| 8,559,405 B2 | 10/2013 | Dinan |
| 8,565,142 B1 | 10/2013 | Dinan |
| 8,588,169 B2 | 11/2013 | Dinan |
| 8,599,785 B1 | 12/2013 | Dinan |
| 8,619,727 B1 | 12/2013 | Dinan |
| 8,625,524 B2 | 1/2014 | Dinan |
| 8,804,668 B2 | 8/2014 | Dinan |
| 8,897,248 B2 | 11/2014 | Dinan |
| 8,934,438 B2 | 1/2015 | Dinan |
| 8,958,342 B2 | 2/2015 | Dinan |
| 8,964,590 B2 | 2/2015 | Dinan |
| 8,964,593 B2 | 2/2015 | Dinan |
| 8,964,683 B2 | 2/2015 | Dinan |
| 8,964,780 B2 | 2/2015 | Dinan |
| 8,971,280 B2 | 3/2015 | Dinan |
| 8,971,298 B2 | 3/2015 | Dinan |
| 8,976,765 B2 | 3/2015 | Dinan |
| 8,982,852 B2 | 3/2015 | Dinan |
| 8,989,128 B2 | 3/2015 | Dinan |
| 8,995,381 B2 | 3/2015 | Dinan |
| 8,995,405 B2 | 3/2015 | Dinan |
| 9,084,228 B2 | 7/2015 | Dinan |
| 9,084,270 B2 | 7/2015 | Dinan |
| 9,107,206 B2 | 8/2015 | Dinan |
| 9,113,387 B2 | 8/2015 | Dinan |
| 9,161,322 B2 | 10/2015 | Dinan |
| 9,161,323 B2 | 10/2015 | Dinan |
| 9,179,420 B2 | 11/2015 | Dinan |
| 9,179,425 B2 | 11/2015 | Dinan |
| 9,179,454 B2 | 11/2015 | Dinan |
| 9,179,457 B2 | 11/2015 | Dinan |
| 9,204,406 B2 | 12/2015 | Dinan |
| 9,204,407 B2 | 12/2015 | Dinan |
| 2008/0219670 A1 | 9/2008 | Kim et al. |
| 2009/0067352 A1 | 3/2009 | Wang |
| 2011/0064007 A1 | 3/2011 | Wang |
| 2012/0257552 A1 | 10/2012 | Chen et al. |
| 2012/0263128 A1 | 10/2012 | Hu et al. |
| 2013/0039291 A1* | 2/2013 | Blankenship .......... H04L 5/001 370/329 |
| 2013/0188612 A1 | 7/2013 | Dinan |
| 2013/0188617 A1 | 7/2013 | Dinan |
| 2013/0188620 A1 | 7/2013 | Dinan |
| 2013/0250881 A1* | 9/2013 | Liao ...................... H04W 36/08 370/329 |
| 2013/0258862 A1 | 10/2013 | Dinan |
| 2013/0258956 A1 | 10/2013 | Dinan |
| 2013/0258958 A1 | 10/2013 | Dinan |
| 2013/0259008 A1 | 10/2013 | Dinan |
| 2013/0260735 A1 | 10/2013 | Dinan |
| 2013/0272229 A1 | 10/2013 | Dinan |
| 2013/0279446 A1* | 10/2013 | Lv ......................... H04L 5/001 370/329 |
| 2013/0336295 A1 | 12/2013 | Dinan |
| 2014/0105175 A1 | 4/2014 | Dinan |
| 2014/0185467 A1* | 7/2014 | Heo ...................... H04W 52/54 370/252 |
| 2014/0307638 A1* | 10/2014 | Zacharias ............. H04L 5/0053 370/329 |
| 2015/0124787 A1 | 5/2015 | Dinan |
| 2015/0131589 A1 | 5/2015 | Dinan |
| 2015/0131590 A1 | 5/2015 | Dinan |
| 2015/0139140 A1 | 5/2015 | Dinan |
| 2015/0139161 A1 | 5/2015 | Dinan |
| 2015/0139162 A1 | 5/2015 | Dinan |
| 2015/0139202 A1 | 5/2015 | Dinan |
| 2015/0181547 A1 | 6/2015 | Dinan |
| 2015/0304891 A1 | 10/2015 | Dinan |
| 2015/0319752 A1 | 11/2015 | Dinan |
| 2015/0319786 A1 | 11/2015 | Dinan |
| 2016/0050647 A1* | 2/2016 | Hwang ............... H04L 12/4641 370/329 |

* cited by examiner

— BACKHAUL LINK WITHIN CLUSTER

·—·—·— BACKHAUL LINK BETWEEN SMALL CELLS & MACRO CELL

——— BACKHAUL LINK WITHIN CLUSTER

—·—·— BACKHAUL LINK BETWEEN SMALL CELLS & MACRO CELL

— BACKHAUL LINK WITHIN CLUSTER

-·-·-· BACKHAUL LINK BETWEEN SMALL CELLS & MACRO CELL

— BACKHAUL LINK WITHIN CLUSTER

-·-·-·- BACKHAUL LINK BETWEEN SMALL CELLS & MACRO CELL

METHOD AND APPARATUS FOR CARRIER AGGREGATION

CROSS REFERENCE TO RELATED APPLICATIONS

This application is a National Stage Patent Application of PCT International Patent Application No. PCT/KR2014/006704 (filed on Jul. 23, 2014) under 35 U.S.C. § 371, which claims priority to Korean Patent Application Nos. 10-2013-0088899 (filed on Jul. 26, 2013), 10-2013-0125615 (filed on Oct. 21, 2013), 10-2014-0007158 (filed on Jan. 21, 2014), and 10-2014-0015093 (filed on Feb. 10, 2014), the teachings of which are incorporated herein in their entireties by reference.

TECHNICAL FIELD

The present disclosure relates to a method and an apparatus for performing carrier aggregation and, more specifically, to a method and an apparatus for performing carrier aggregation in different situations where duplex modes of two or more cells are respectively set to Frequency Division Duplex (FDD) and Time Division Duplex (TDD) or in a small cell environment.

BACKGROUND ART

With the progress of communication systems, a wide variety of wireless terminals has been introduced to consumers such as companies and individuals. A current mobile communication system has been affiliated with Third Generation Partnership Project (3GPP), for example, Long Term Evolution (LTE), LTE-Advanced (LTE-A), and the like. Such a mobile communication system is a high-speed and high-capacity communication system capable of transmitting and receiving various data, such as image data, wireless data, and the like, beyond providing voice-oriented services. Accordingly, there are demands for a technology capable of transmitting a large amount of data at a high speed coming close to that of a wired communication network. Meanwhile, according to the introduction of deployment such as multiple cells or a small cell, there is a need for technology and a method which enable carrier aggregation to be applied in various development scenarios. Also, there is a need for technology which controls such that a joint operation and carrier aggregation can be supported which allow transmission/reception to be performed in multiple base stations or in a heterogeneous network in different situations where duplex modes of two or more cells are respectively set to FDD and TDD.

DETAILED DESCRIPTION OF THE DISCLOSURE

Technical Problem

An aspect of the present disclosure is to set a cell to allow the execution of a joint operation and carrier aggregation by a base station and a user equipment that perform transmission/reception in multiple base stations or in a heterogeneous network in different situations where duplex modes of two or more cells are respectively set to FDD and TDD. Accordingly, a base station, a user equipment, and operation methods thereof for improving communication efficiency by performing carrier aggregation and a joint operation so as to aggregate carriers and perform scheduling when duplex modes of two or more cells are different.

Another aspect of the present disclosure is to provide a base station, a user equipment, and operation methods thereof for improving communication efficiency by performing carrier aggregation and a joint operation so as to aggregate carriers and perform scheduling when supporting carrier aggregation and a joint operation of a macrocell and a small cell and when supporting a dual connectivity between the macrocell and the small cell.

Technical Solution

In order to solve the above-mentioned first technical problem, in accordance with an aspect of the present disclosure, there is provided a method for performing carrier aggregation by a user equipment. The method includes: receiving indices of one or more Secondary Cells (SCells) controlled by a first base station and indices of one or more SCells controlled by a second base station; and performing a function of a Primary Cell (PCell) by using one of the SCells of the second base station.

The function of the PCell may include a function of transmitting a Physical Uplink Control CHannel (PUCCH). Also, the SCell performing the function of the PCell may be set not to be capable of being cross-carrier scheduled.

The function of the PCell may include one or more of a cross-carrier scheduling function and a function of receiving a random access response message in a non-contention based random access procedure.

The receiving of the indices of the one or more SCells may include independently setting the SCell index of the first base station and the SCell index of the second base station such that the SCell index of the first base station overlaps the SCell index of the second base station.

The receiving of the indices of the one or more SCells may include setting the SCell index of the first base station and the SCell index of the second base station without discrimination such that the SCell index of the first base station does not overlap the SCell index of the second base station.

In accordance with another aspect of the present disclosure, there is provided a method for performing carrier aggregation by a first base station. The method includes: setting indices of one or more SCells controlled by the first base station and indices of one or more SCells controlled by the second base station; setting execution of a function of a PCell using one of the SCells of the second base station; and transmitting, to a user equipment, information indicating the execution of the function of the PCell using one of the SCells of the second base station.

The function of the PCell may include a function of receiving a PUCCH. The method may further include setting the SCell performing the function of the PCell not to be capable of being cross-carrier scheduled.

The function of the PCell may include one or more of a cross-carrier scheduling function and a function of transmitting a random access response message in a non-contention based random access procedure.

The setting of the indices of the one or more SCells may include independently setting the SCell index of the first base station and the SCell index of the second base station such that the SCell index of the first base station overlaps the SCell index of the second base station.

The setting of the indices of the one or more SCells may include setting the SCell index of the first base station and the SCell index of the second base station without discrimination such that the SCell index of the first base station does not overlap the SCell index of the second base station.

In accordance with still another aspect of the present disclosure, there is provided a user equipment for performing carrier aggregation. The user equipment includes: a transmission unit for performing transmission in uplink to a first base station and/or a second base station; a reception unit for performing reception in downlink from the first base station and/or the second base station; and a control unit for receiving indices of one or more SCells controlled by the first base station and indices of one or more SCells controlled by the second base station, wherein the control unit controls the transmission unit and the reception unit to perform a function of a PCell by using one of the SCells of the second base station.

The function of the PCell enables transmission of a PUCCH by the transmission unit.

The SCell performing the function of the PCell may be set not to be capable of being cross-carrier scheduled.

The function of the PCell may include one or more of a cross-carrier scheduling function, and a function of receiving a random access response message in a non-contention based random access procedure.

The control unit may independently set the SCell index of the first base station and the SCell index of the second base station such that the SCell index of the first base station overlaps the SCell index of the second base station.

The control unit may set the SCell index of the first base station and the SCell index of the second base station without discrimination such that the SCell index of the first base station does not overlap the SCell index of the second base station.

In accordance with yet another aspect of the present disclosure there is provided a base station for performing carrier aggregation. The base station includes: a transmission unit for performing transmission in downlink to a user equipment; a reception unit for performing reception in uplink from the user equipment; and a control unit for setting indices of one or more SCells controlled by the base station and indices of one or more SCells controlled by a second base station distinguished from the base station, and setting the execution of a function of a PCell using one of the SCells of the second base station, wherein the control unit controls the transmission unit and the reception unit to transmit information, which indicates the execution of the function of the PCell using one of the SCells of the second base station, to the user equipment.

The function of the PCell enables reception of a PUCCH by the reception unit.

The control unit may set the SCell performing the function of the PCell not to be capable of being cross-carrier scheduled.

The function of the PCell may include one or more of a cross-carrier scheduling function and a function of transmitting a random access response message in a non-contention based random access procedure.

The control unit may independently set the SCell index of the base station and the SCell index of the second base station such that the SCell index of the base station overlaps the SCell index of the second base station. Also, the control unit may distinguish the SCell index of the base station from the SCell index of the second base station such that the SCell index of the base station does not overlap the SCell index of the second base station.

In order to solve the above-mentioned second technical problem, in accordance with an aspect of the present disclosure, there is provided a method for performing carrier aggregation by a base station. The method includes: transmitting, to a user equipment, information which sets, as a first SCell, a carrier of a second duplex mode different from a first duplex mode of a PCell that the user equipment accesses in different duplex modes; and performing, by the base station and the user equipment, a function of a PCell by using the first SCell.

The function of the PCell may be one or more of transmission/reception of a PUCCH, cross-carrier scheduling, and transmission/reception of a random access response. The first SCell may be set to be self-carrier scheduled. Also, the first SCell may be set not to be cross-carrier scheduled. The first SCell may have a lowest SCell index.

Meanwhile, indices of one or more SCells of the first duplex mode and indices of one or more SCells of the second duplex mode may be independently set. Also, the method may further include setting indices of one or more SCells of the first duplex mode and indices of one or more SCells of the second duplex mode without discrimination.

Meanwhile, the method may further include setting one carrier of the second duplex mode as a second PCell distinguished from the PCell, and setting one carrier of the first duplex mode as a second SCell distinguished from the first SCell.

In accordance with another aspect of the present disclosure, there is provided a method for performing carrier aggregation by a user equipment. The method includes: receiving, from a base station, information which sets, as a first SCell, a carrier of a second duplex mode different from a first duplex mode of a PCell on which the user equipment accesses the base station in different duplex modes; and performing a function of the PCell, by the user equipment and the base station, by using the first SCell.

The function of the PCell may be one or more of transmission/reception of a PUCCH, cross-carrier scheduling, and transmission/reception of a random access response. The first SCell may be self-carrier scheduled. The first SCell may not be cross-carrier scheduled. The first SCell may have a lowest SCell index.

Meanwhile, indices of one or more SCells of the first duplex mode and indices of one or more SCells of the second duplex mode may be independently set. Also, indices of one or more SCells of the first duplex mode and indices of one or more SCells of the second duplex mode may be set without discrimination.

The method may further include setting one carrier of the second duplex mode as a second PCell distinguished from the PCell, and setting one carrier of the first duplex mode as a second SCell distinguished from the first SCell.

In accordance with still another aspect of the present disclosure, there is provided a base station for performing carrier aggregation. The base station includes: a reception unit for performing reception in uplink from a user equipment in different duplex modes; a control unit for generating information which sets, as a first SCell, a carrier of a second duplex mode different from a first duplex mode of a PCell that the user equipment accesses; and a transmission unit for transmitting the generated information to the user equipment, wherein the control unit controls the transmission unit and the reception unit in such a manner that the base station and the user equipment perform a function of the PCell by using the first SCell.

The control unit may perform, by using the first SCell, one or more of transmission/reception of a PUCCH, cross-carrier scheduling, and transmission/reception of a random access response. The first SCell may be set to be self-carrier scheduled. Also, the first SCell may be set not to be cross-carrier scheduled. The first SCell may have a lowest SCell index.

The control unit may independently set indices of one or more SCells of the first duplex mode and indices of one or more SCells of the second duplex mode. Also, the control unit may set indices of one or more SCells of the first duplex mode and indices of one or more SCells of the second duplex mode without discrimination.

The control unit may set one carrier of the second duplex mode as a second PCell distinguished from the PCell, and may set one carrier of the first duplex mode as a second SCell distinguished from the first SCell.

In accordance with yet another aspect of the present disclosure, there is provided a user equipment for performing carrier aggregation. The user equipment includes: a transmission unit for performing transmission in uplink to a base station in different duplex modes; a reception unit for receiving, from the base station, information which sets, as a first SCell, a carrier of a second duplex mode different from a first duplex mode of a PCell on which the user equipment accesses the base station in different duplex modes; and a control unit for controlling the transmission unit and the reception unit in such a manner that the user equipment and the base station perform a function of the PCell by using the first SCell.

The control unit may perform, by using the first SCell, one or more of transmission/reception of a PUCCH, cross-carrier scheduling, and transmission/reception of a random access response. At this time, the first SCell may be self-carrier scheduled. Also, the first SCell may not be cross-carrier scheduled. At this time, the first SCell may have a lowest SCell index.

The control unit may independently set indices of one or more SCells of the first duplex mode and indices of one or more SCells of the second duplex mode. Also, the control unit may set indices of one or more SCells of the first duplex mode and indices of one or more SCells of the second duplex mode without discrimination.

The control unit may set one carrier of the second duplex mode as a second PCell distinguished from the PCell, and may set one carrier of the first duplex mode as a second SCell distinguished from the first SCell.

Advantageous Effects

In the case of the implementation of the present disclosure, when a base station considers a joint operation and carrier aggregation of FDD and TDD which are different duplex modes, the base station can set a secondary cell for a user equipment, and operational processes of the base station and user equipment for the same and apparatuses for the same can be implemented.

In the case of the implementation of the present disclosure, when carrier aggregation and a joint operation of a macrocell and a small cell, and a dual connectivity therebetween are supported, a secondary cell can be designated.

MODE FOR CARRYING OUT THE INVENTION

Figure 1:
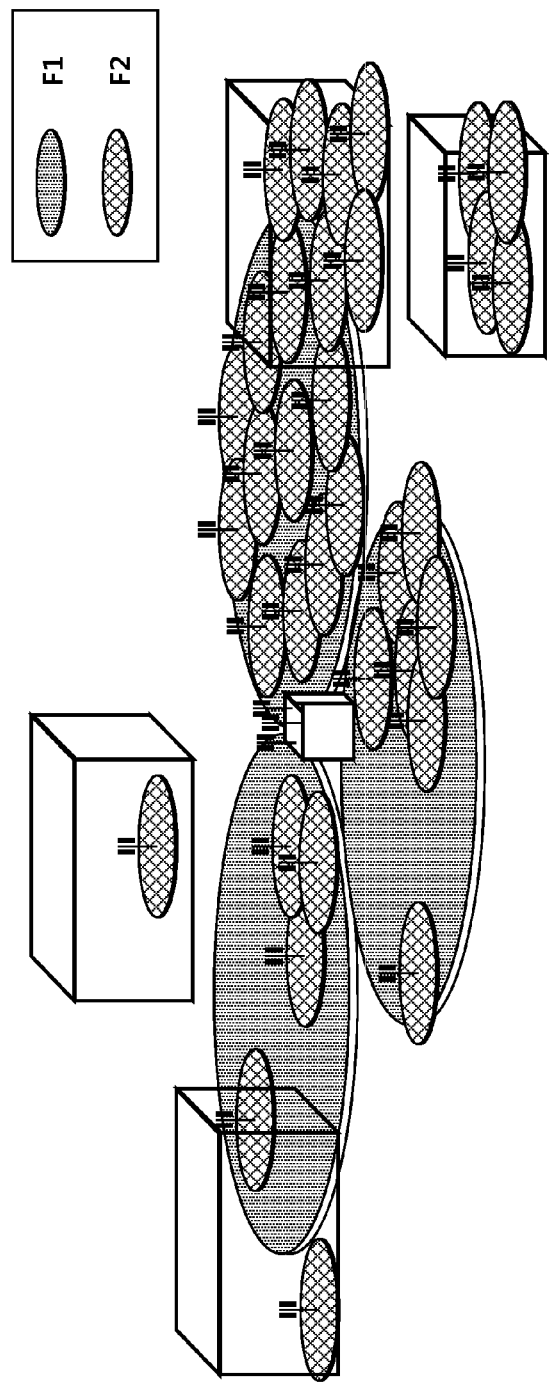
FIG. 1 is a view illustrating small cell deployment according to an embodiment of the present disclosure.

Hereinafter, few embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communications (GSM).

A base station or a cell may generally refer to a station communicating with a User Equipment (UE). The base station may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

In the specification, the base station or the cell may have an inclusive concept indicating a portion of an area covered and functions performed by a BSC (Base Station Controller) in CDMA, a NodeB in WCDMA, an eNB or a sector (site) in LTE, and the like. The base station or cell may include various coverage areas, such as a megacell, a macrocell, a microcell, a picocell, a femtocell, a communication range of a relay node, an RRU, and an RU, and the like.

Each of the above mentioned various cells has a base station that controls a corresponding cell. The base station may be construed in two ways: i) the base station may be a device itself that provides a megacell, a macrocell, a microcell, a picocell, a femtocell, and a small cell in association with a wireless area, or ii) the base station may indicate a wireless area itself. In i), a base station may indicate devices that interact with one another and cooperate each other to provide a predetermined wireless area to be controlled by an identical entity or to configure the wireless area. Based on a configuration type of a wireless area, a base station may be referred to as an eNB, an RRH, an antenna, an RU, a Low Power Node (LPN), a point, a transmission/reception point, a transmission point, a reception point, and the like. A base station may be indicated as a wireless area itself that receives or transmits a signal from the perspective of a UE or a neighboring base station.

Therefore, a base station may be commonly referred to as a megacell, a macrocell, a microcell, a picocell, a femtocell, a small cell, an RRH, an antenna, an RU, an LPN, a point, an eNB, a transmission/reception point, a transmission point, and a reception point.

In the specification, the user equipment and the base station are described as two inclusive transceiving subjects to embody the technology and technical concepts described in the specifications. However, it may not be limited to a predetermined term or word. The user equipment and the base station are described as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times. Alternatively, uplink transmission and downlink transmission may be performed based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

In addition, control information may also be transmitted using an EPDCCH (enhanced PDCCH or extended PDCCH).

In the specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macrocell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, an event in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, a PDCCH, which corresponds to an embodiment of the present disclosure, may be applied to the part described using a PDCCH.

Meanwhile, high layer signaling as used herein includes RRC signaling for transmitting RRC information including RRC parameters.

An eNB executes downlink transmission to UEs. The eNB 110 may transmit a Physical Downlink Shared Channel (PDSCH) which is a primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A small cell using a low-power node is considered as a means for coping with mobile traffic explosion. A low-power node denotes a node using lower transmission (Tx) power than that of a typical macro node.

Through Carrier Aggregation (hereinafter referred to as "CA") technology before 3rd Generation Partnership Project (3GPP) Release 11, a small cell may be built by using low-power Remote Radio Head (RRH) which is geographically-distributed antennas within a macrocell coverage.

However, in order to apply the CA technology, the macrocell and the RRH cell are built to be scheduled under the control of one BS. To this end, it is required to build an ideal backhaul between the macrocell node and the RRH.

The ideal backhaul refers to a backhaul showing very high throughput and a very short delay, such as a dedicated point-to-point connection using an optical line (optical fiber) and a Line-Of-Sight (LOS) microwave.

In contrast, a non-ideal backhaul refers to a backhaul showing relatively low throughput and a relatively long delay, such as a Digital Subscriber Line (xDSL) and a non-LOS microwave.

Through the above-described single BS-based CA technology, multiple serving cells may be aggregated and may provide a service to the UE. Specifically, the multiple serving cells may be configured for the UE in a Radio Resource Control (hereinafter referred to as "RRC")-connected state, and the macrocell and the RRH cell may be configured together as a serving cell and may provide a service to the UE, when the ideal backhaul is built between the macrocell node and the RRH.

When the single BS-based CA technology is configured, the UE may have only one RRC connection with a network. At RRC connection establishment/re-establishment/handover, one serving cell provides Non-Access Stratum (hereinafter referred to as "NAS") mobility information (e.g., a Tracking Area Identity (TAI)), and at RRC connection re-establishment/handover, one serving cell provides a security input. Such a cell is referred to as a "Primary Cell (PCell)." The PCell may be changed according to only a handover procedure. According to UE capabilities, Secondary Cells (SCells) and a PCell may be configured together as a serving cell.

Embodiments of the present disclosure relate to a base station, a user equipment, and operating methods thereof for enabling the UE belonging to a relevant BS to support a joint operation of FDD and TDD when a small cell and an optional cell/BS/RRH/antenna/RU support different duplex modes (i.e., FDD and TDD) in a multilayer cell structure. Hereinafter, such method will be described.

Also, embodiments of the present disclosure relate to a method for designating an SCell when each duplex mode is used in a macrocell, a small cell, and an optional cell/BS/RRH/antenna/RU regardless of a duplex mode and supports CA of a macrocell and a small cell, a joint operation thereof, and a dual connectivity therebetween.

Hereinafter, a small cell deployment scenario will be described as a communication environment where embodiments of the present disclosure will be applied to.

FIG. 1 is a view illustrating small cell deployment according to an embodiment of the present disclosure.

Figure 2:
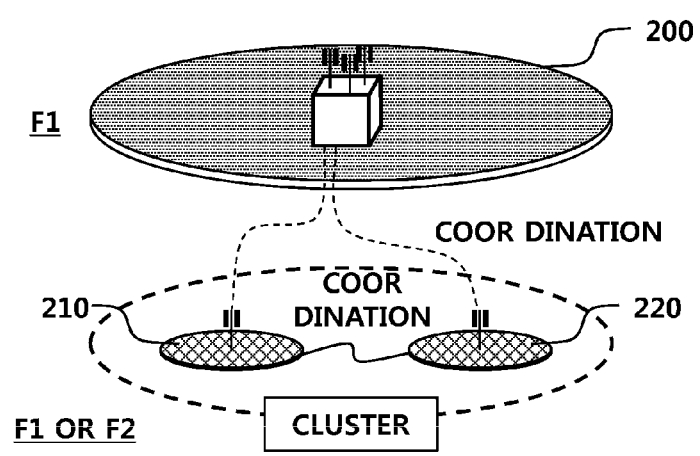
FIG. 2 is a view illustrating a small cell deployment scenario.
Figure 3:
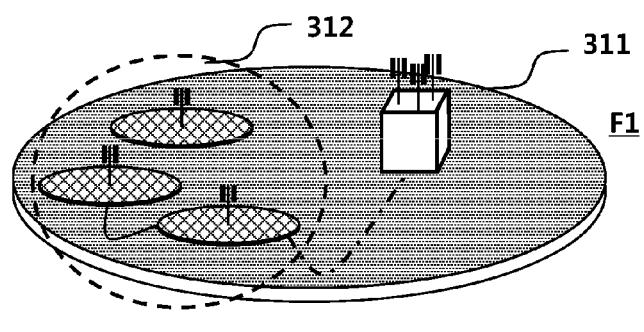
FIG. 3 to FIG. 6 are views each illustrating a detailed scenario of small cell deployment.

Referring to FIG. 1, a communication environment includes small cells overlaying with and a macrocell. In FIG. 2 and FIG. 3 below, such a communication environment is classified in more detail according to whether macro coverage exists, whether a relevant small cell is for outdoor or indoor use, whether deployment of relevant small cells is in a sparse situation or in a dense situation, and whether an identical frequency spectrum is used.

FIG. 2 is a view illustrating a small cell deployment scenario. The small cell deployment of FIG. 2 denotes a typical representative configuration of the scenario of FIG. 3. FIG. 2 illustrates the small cell deployment scenario, and the small cell deployment scenario includes scenarios #1, #2a, #2b, and #3. Reference numeral 200 indicates a macrocell, and each of reference numerals 210 and 220 indicates a small cell. In FIG. 2, an overlaid macrocell may exist or may not exist. Coordination may be performed between the macrocell 200 and the small cells 210 and 220, and coordination may also be performed between the small cells 210 and 220. Further, overlaid areas of the macrocell 200 and the small cells 210 and 220 may be tied to a cluster.

FIG. 3 to FIG. 6 illustrate scenarios of small cell deployment.

FIG. 3 illustrates a small cell deployment scenario #1. The scenario 1 is a co-channel deployment scenario of a small cell and a macrocell in the existence of an overhead macro, and is an outdoor small-cell scenario. In FIG. 3, a macrocell 311 and small cells are all outdoor cells, and reference numeral 312 indicates a small cell cluster. All users are distributed in indoor and outdoor environments.

Solid lines connecting the small cells within the small cell cluster 312 signify a backhaul link within the cluster. Dotted lines connecting the macrocell BS to the small cells within the cluster signify a backhaul link between the small cells and the macrocell.

Figure 4:
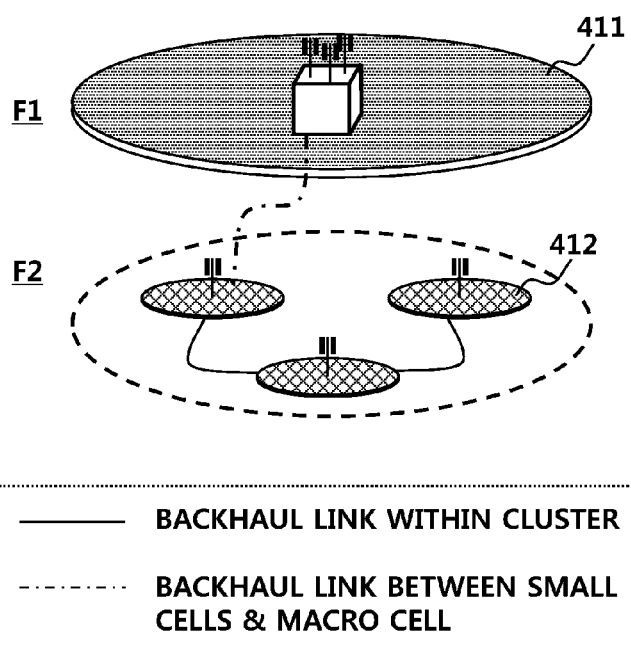

FIG. 4 illustrates a small cell deployment scenario #2a. The scenario 2a is a deployment scenario in which small cells and a macrocell use different frequency spectrums in the existence of an overlaid macrocell, and the scenario 2a is an outdoor small-cell scenario. In FIG. 4, the macrocell 411 and the small cells are all outdoor cells, and reference numeral 412 indicates a small cell cluster. All users are distributed in indoor and outdoor environments.

Solid lines connecting the small cells within the small cell cluster 412 denote a backhaul link within the cluster. Dotted lines connecting the macrocell BS to the smalls within the cluster denote a backhaul link between the small cells and the macrocell.

Figure 5:
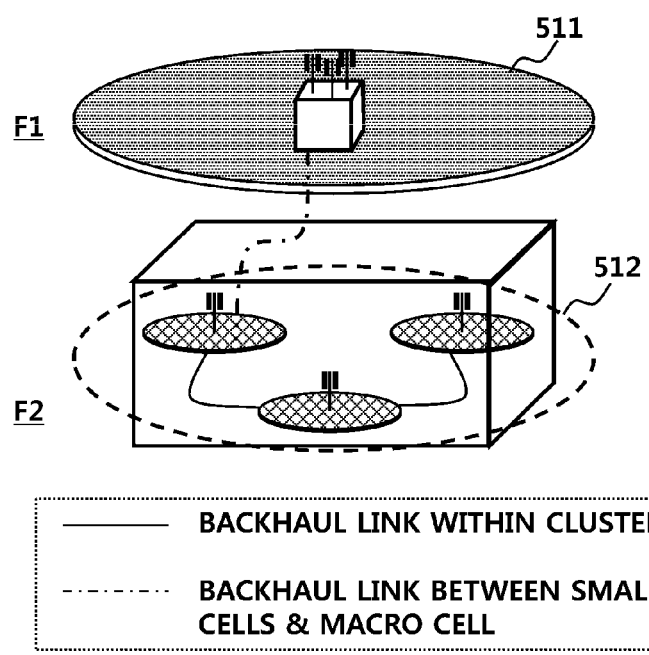

FIG. 5 illustrates a small cell deployment scenario #2b. The scenario 2b is a deployment scenario in which small cells and a macrocell use different frequency spectrums in the existence of an overlaid macrocell, and the scenario 2b is an indoor small-cell scenario. The macrocell 511 is an outdoor cell, the small cells are all indoor cells, and reference numeral 512 indicates a small cell cluster. All users are distributed in indoor and outdoor environments.

Solid lines connecting the small cells within the small cell cluster 512 signify a backhaul link within the cluster. Dotted lines connecting the macrocell BS to the small cells within the cluster signify a backhaul link between the small cells and the macrocell.

Figure 6:
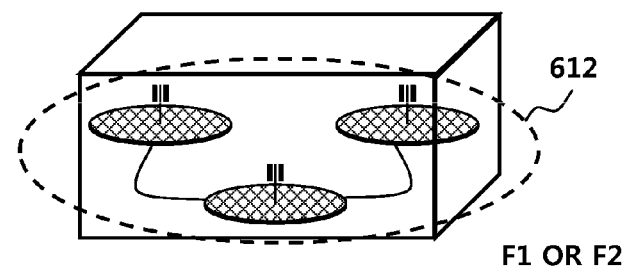

FIG. 6 illustrates a small cell deployment scenario #3. The scenario 3 is an indoor small-cell scenario in a situation where a coverage of a macro does not exist. Reference numeral 612 indicates a small cell cluster. Also, the small cells are all indoor cells, and all users are distributed in indoor and outdoor environments.

Solid lines connecting the small cells within the small cell cluster 612 signify a backhaul link within the cluster. Dotted lines connecting the macrocell BS to the smalls within the cluster signify a backhaul link between the small cells and the macrocell.

Frequencies F1 and F2 used in FIG. 1 and the various small cell scenarios of FIG. 2 to FIG. 6, which have been described above, may be frequencies supporting an identical duplex mode, or may have different duplex modes, respectively. For example, F1 denotes a frequency supporting an FDD mode and F2 denotes a frequency supporting a TDD mode. Alternatively, another case may be considered in which F1 is a frequency supporting a TDD mode and F2 is a frequency supporting an FDD mode.

Figure 7:
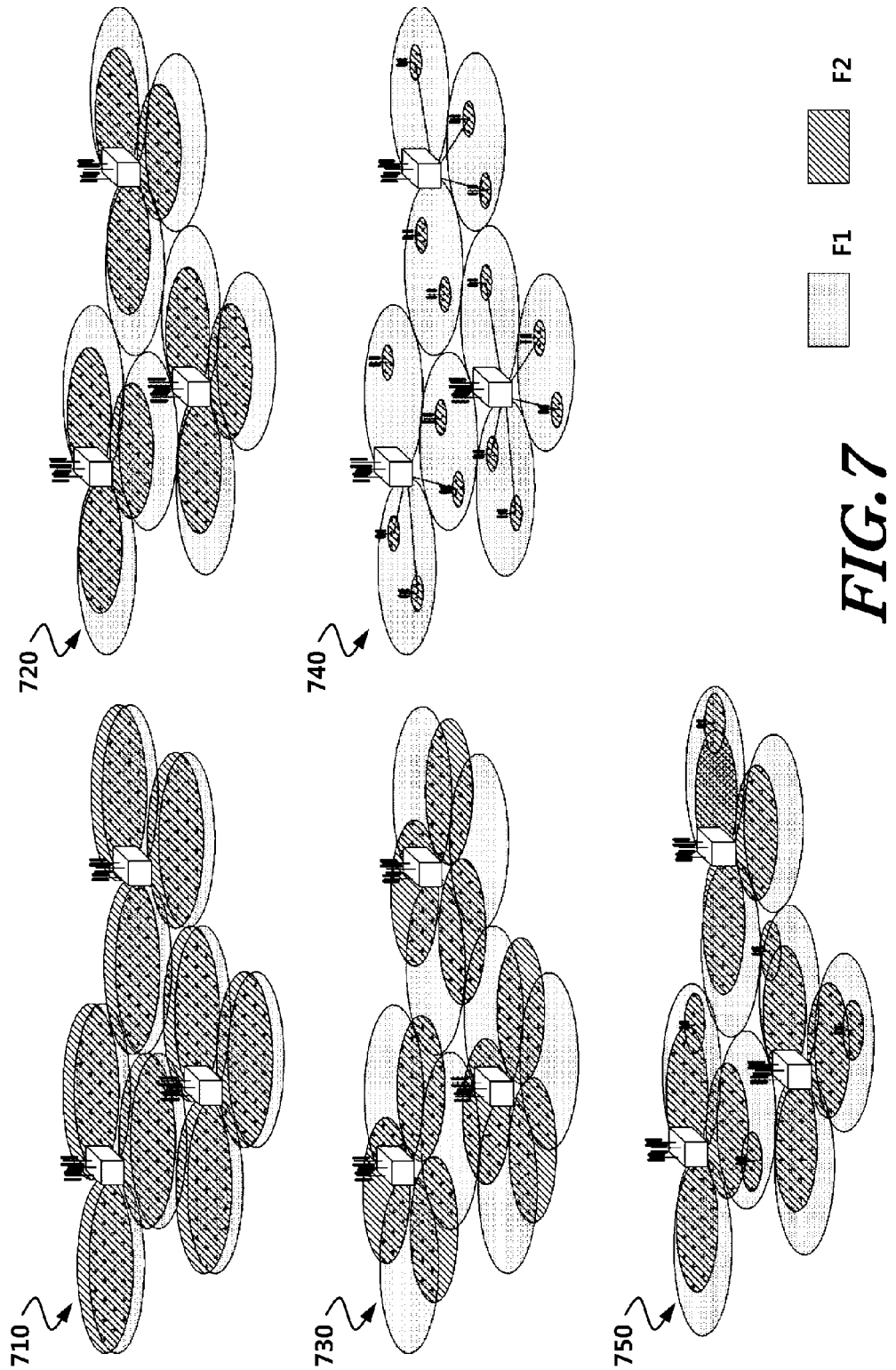
FIG. 7 is a view illustrating various scenarios of carrier aggregation.

FIG. 7 illustrates various scenarios of CA.

Referring to FIG. 7, even in a CA scenario, the frequencies F1 and F2 may be frequencies supporting an identical duplex mode, or may be frequencies supporting different duplex modes.

Reference numeral 710 indicates a communication environment that F1 and F2 cells are co-located and overlaid under coverages which are nearly identical to each other. Reference numeral 710 indicates a scenario in which the two layers provide sufficient coverage and mobility and the overlaid F1 and F2 cells can be aggregated.

Reference numeral 720 indicates a scenario in which the F1 and F2 cells are co-located and overlaid but the coverage of F2 is smaller than that of F1. Reference numeral 720 indicates the scenario in which F1 has sufficient coverage, mobility support is also performed based on the F1 coverage, F2 is used to improve throughput, and the overlaid F1 and F2 cells can be aggregated.

Reference numeral 730 indicates a scenario in which the F1 and F2 cells are co-located but F2 antennas are directed to the edge of a cell in order to increase cell edge throughput. Reference numeral 730 indicates the scenario in which mobility support is performed based on the F1 coverage, and F1 has sufficient coverage but F2 temporarily has a coverage hole. In the scenario, the F1 and F2 cells in an identical eNB can be aggregated at a place where coverages of the F1 and F2 cells are overlaid.

Reference numeral 740 indicates a scenario in which F1 has macro coverage and an RRH at F2 is used to improve throughput in a hot spot area. In the scenario, mobility support is performed based on the F1 coverage and the F1 macrocell and cells of F2 RRHs can be aggregated together.

Similarly to the scenario indicated by reference numeral 720, a scenario indicated by reference numeral 750 is a scenario in which frequency-selective repeaters are deployed to extend the coverage of one carrier. In the scenario, the F1 and F2 cells in an identical eNB may be aggregated at a place where coverages of the F1 and F2 cells are overlaid. In this specification, when a UE configures a dual connectivity, a BS will be described as a master BS or a first BS, if the BS forms an RRC connection with the UE and provides a cell (e.g., a PCell) that becomes a reference of a handover, terminates an S1-Mobility Management Entity (MME), and serves as a mobility anchor in a core network.

The master BS or the first BS may be a BS providing a macrocell. Alternatively, the master BS (or the first BS) may be a BS providing any one small cell when a dual connectivity is formed between small cells.

Meanwhile, in a dual connectivity environment, a BS, distinguished from the master BS, providing additional radio resources to the UE, will be described as a secondary BS or a second BS.

Each of the first BS (or the master BS) and the second BS (or the secondary BS) may provide at least one cell to the UE, and the first and second BSs may be connected to each other through an interface therebetween.

Also, in order to help understanding, a cell associated with the first BS may be described as a macrocell, and a cell associated with the second BS may be described as a small cell. However, in a small cell cluster scenario described below, even a cell associated with the first BS may be described as a small cell.

In the present disclosure, a macrocell may signify each of cells associated with the first BS, or a representative one of the cells associated with the first BS. Also, a small cell may signify each of cells associated with the second BS, or a representative one of the cells associated with the second BS. However, it is not limited thereto. For example, in a particular scenario (e.g., a small cell cluster), a small cell may be a cell associated with the first BS. In this case, a cell of the second BS may be described as another small cell or still another small cell.

Hereinafter, for convenience and ease of description, a macrocell may denote a cell associated with the master BS or the first BS, and a small cell may denotes a cell associated with the secondary BS or the second BS. However, the present disclosure is not limited thereto. Accordingly, embodiments of the present disclosure may be applied even to a situation where the secondary BS or the second BS is associated with the macrocell and the master BS or the first BS is associated with the small cell.

When CA is supported, CA may be considered to be performed within of a FDD mode or a TDD mode. When CA is considered to be performed in an identical mode such as each of the FDD mode and the TDD mode, component carrier (CC) may be set to be discriminated as follows.

First, a primary cell (Pcell) will be described.

When CA is configured, i) the UE has one RRC connection with a network, ii) one serving cell provides NAS mobility information during RRC connection establishment/re-establishment/handover, and iii) one serving cell provides a security input during RRC connection re-establishment/handover. Such a serving cell is referred to as a primary cell "PCell." A carrier corresponding to a PCell includes a Downlink Primary Component Carrier (DL PCC) in DL and an Uplink Primary Component Carrier (UL PCC) in UL.

The primary cell (Pcell) may be changed only by a handover procedure. The Pcell is used to transmit a PUCCH. Also, the PCell may not be deactivated differently from secondary cells (Scells). Also, re-establishment is triggered when the PCell experiences a Radio Link Failure (RLF), but is not achieved when an SCell experiences an RLF. Further, NAS information is obtained from the PCell.

Next, a secondary cell (Scell) will be described.

Depending on UE capability, SCells and a PCell may be configured together in the form of a set of serving cells. A carrier corresponding to an SCell includes a DL Secondary Component Carrier (DL SCC) in DL a UL Secondary Component Carrier (UL SCC) in UL.

A set of serving cells, which is configured for one UE, includes one PCell and one or more SCells. The number of serving cells depends on aggregation capability of the UE.

Scell reconfiguration, Scell addition and Scell removal may be performed by RRC. The RRC may reconfigure, add, and remove SCells in order to use SCells together with a target PCell during an intra-LTE handover. When new SCells are added, dedicated RRC signaling is used to transmit all pieces of required system information of SCells. In a connected mode, the UE does not need to directly obtain broadcasted system information from SCells.

When CA is supported, CA may be considered to be performed in each of a FDD mode and a TDD mode. However, an aggregation operation and a joint operation have not been considered to be performed in carriers having different duplex modes such as FDD and TDD. Such an aggregation operation and joint operation in carriers having different duplex modes (e.g., FDD and TDD) are provided in accordance with embodiments to the present disclosure.

Accordingly, in accordance with embodiments of the present disclosure, an operating method of a UE and an operating method of a BS may be provided for performing a joint operation and a CA operation in different duplex modes (e.g., FDD and TDD).

Also, in accordance with embodiments of the present disclosure, a method may be provided for designating an SCell when the respective duplex modes are used in a small cell regardless of a duplex mode in a small cell environment considering a non-ideal backhaul even in an identical duplex mode and when the respective duplex modes support CA of a macrocell and a small cell, a joint operation thereof, and a dual connectivity therebetween.

When a BS considers a joint operation and CA of different duplex modes (e.g., FDD and TDD) with respect to a UE, it is required to define an operating method of the UE and an operation of the BS differently from a case where the existing CA is performed in each of the duplex modes. Accordingly, in accordance with embodiments of the present disclosure, a UE, a base station, and operating methods thereof may be provided for setting an operation of the UE by the BS, in the relevant case.

Also, when the respective duplex modes are used in a small cell regardless of a duplex mode in an environment of a macrocell and a small cell which considers a non-ideal backhaul even in an identical duplex mode, and when the respective duplex modes support CA of a macrocell and a small cell, a joint operation thereof, and a dual connectivity therebetween, an operating method of a UE and an operation of a BS need to be defined differently from a case where the existing CA is performed by one BS. According to the embodiments of the present disclosure, a UE, a BS, and operating methods thereof may be provided for setting an operation of the UE by a BS.

When a BS considers a joint operation and CA of different duplex modes (e.g., FDD and TDD) with respect to a UE, it is required to define an operating method of the UE and an operation of the BS differently from a case where the existing CA is performed in each of the duplex modes. Accordingly, according to the embodiments of the present disclosure, a UE, a BS, and operating methods thereof may be provided for setting an operation of the UE by the BS.

Embodiments of the present disclosure enable the designation of an SCell when CA and a joint operation of a macrocell and a small cell, and a dual connectivity therebetween are supported.

In embodiments of the present disclosure, first, the following methods may be considered for defining/designating/setting a PCell during a joint operation and CA of TDD and FDD.

First Embodiment 1: a Duplex Mode-Dependent PCell Definition Method

The first embodiment 1 is a method for defining a PCell depending on a duplex mode. That is, it is a method for designating one PCell for each of an frequency division duplex (FDD) mode and a time division duplex (TDD) mode when a carrier of FDD is set as one or more multiple CCs and when a carrier of TDD is set as one or more multiple CCs with respect to a CC configured for the UE.

This method allows transmission of DL control/data and UL control/data for each of the FDD mode and the TDD mode to follow operations of a PCell and SCells designated for each of the relevant FDD and TDD modes. This method also defines operations of a PCell and SCells transmitting Hybrid Automatic Repeat reQuest (HARQ)-Acknowledgement/Negative Acknowledgement (ACK/NACK) and Uplink Control Information (UCI) as feedback of DL data in order to follow operations of a UE and a BS depending on a PCell and SCells according to the respective duplex modes. In the aspect of transmitting a PUCCH in UL under the relevant CA, a PUCCH defined for each duplex mode enables UCI to be transmitted by using a method in which transmission is performed on only a PCell. Also, when the UCI piggybacks on a PUSCH, it is possible to establish rules as to which CCs (i.e., a PCell, or an SCell) are used to transmit the UCI. For example, when a PCell includes a PUSCH, the UCI may be set to be transmitted through the PUSCH of the PCell. When the PCell does not include a PUSCH but SCells include a PUSCH, the UCI may be set to be transmitted through a PUSCH of an SCell having the lowest index among the relevant SCells. Alternatively, when an aperiodic Channel State Information (CSI) request is designated by the BS, UCI may be set to be transmitted through a PUSCH of the relevant PCell or SCell indicated by a UL grant indicating the relevant aperiodic CSI request.

Also, when a joint operation of TDD and FDD are performed, in an aspect of the transmission of a PUSCH, the transmission of a PDSCH, and the transmission of a PUSCH under the CA, the PDSCH and the PUSCH may be set to be capable of being transmitted according to an operating method of the UE and an operating method of the BS under controlling a PCell defined in each duplex mode.

Finally, the first embodiment 1 may be considered to be a method for minimizing the effect on operations of legacy UEs, when comparing a first case where an operation of the UE and a setting by the BS depending on the joint operation of the TDD and FDD support a FDD-duplex-mode-only under CA with a second case where the operation of the UE and the setting by the BS depending on the joint operation of the TDD and FDD support a TDD-duplex-mode-only under CA, wherein the operation of the UE and the setting by the BS is performed by using a method applied to a case of the CA defined for each of the FDD and TDD modes. Specifically, since there exists an operation as a PCell according to each of the FDD and TDD modes, an operation of the UE and an operation of the BS may be performed independently between the duplex modes, according to operations of a PCell and an SCell defined in each duplex mode. When a PCell is defined/designated/set according to the relevant setting, the first embodiment 1 enables the joint operation and CA of the TDD and FDD to be performed while minimizing the effect on operations of legacy UEs.

However, in the case of the relevant method, when an access procedure is performed, consideration may be given to a scheme which allows a duplex mode, in which access is first performed, to be first set and allows the access procedure to be performed according to the setting of the relevant PCell. Examples of the access procedure may include a cell search procedure, a random access procedure, a handover procedure, and the like. This scheme allows the access procedure to follow the relevant PCell according to whether a synchronization channel used for an FDD carrier is first detected, or whether a synchronization channel used for a TDD carrier is first detected, when a cell search is performed by the UE.

There is another method which sets a priority to be assigned to a particular duplex mode, for example, assigns a priority to an FDD carrier when an LTE network is conventionally deployed by using the FDD carrier and sufficient coverage and mobility support are provided by the relevant FDD carrier, and which allows the access procedure to be performed. Alternatively, another method assigns a priority to a TDD carrier and allows the access procedure to be performed when, differently from the above-described case, an LTE network is conventionally deployed by using the TDD carrier and sufficient coverage and mobility support are provided by the relevant TDD carrier. This method can solve ambiguity between the UE and the BS which may occur in the access procedure according to the setting of a PCell between the different duplex modes.

First embodiment 1 may be applied even to a UE which does not have capability supporting dual-duplex mode for supporting a joint operation and CA of TDD and FDD. Specifically, first embodiment 1 enables the UE to perform a non-CA operation and a CA operation in an FDD-only mode, when the UE accesses a network capable of supporting the relevant FDD-TDD dual-mode although the UE has the FDD-only mode supporting only FDD and can perform non-CA and CA. Also, in the case of the UE which has a TDD-only mode supporting only TDD and can perform non-CA and CA, as described above, first embodiment 1 enables the UE, which has the TDD-only mode, to smoothly perform a non-CA operation and a CA operation in the TDD-only mode, when the UE accesses a network capable of supporting the relevant FDD-TDD dual-mode.

Second Embodiment 2: a Scheme for Performing a Setting in One Duplex Mode and a Method for Configuring One PCell and Configuring Different CCs, which Use an Identical Duplex Mode or Different Duplex Modes, as an SCell Even when CCs supporting a FDD mode and a TDD mode are mixed, the setting of a PCell and an SCell according to the FDD mode and the TDD mode may be performed in an existing scheme used in one duplex mode. For example, there is a method for configuring one PCell and configuring the remaining CCs as an SCell as in a scheme which is set for CA of only FDD carriers and CA of only TDD carriers. Detailed embodiments in the relevant case are as follows.

When one carrier supporting FDD is set as a PCell and the remaining carriers (i.e., carriers supporting TDD or carriers supporting FDD except for the carrier which is set as the PCell) are configured as an SCell, the one carrier and the remaining carriers may be set to configure A-1, A-2, A-3, A-4, and A-5 as follows.

Configuration A-1 {PCell(FDD), SCell-0(TDD)}
Configuration A-2 {PCell(FDD), SCell-0(TDD), SCell-1(FDD or TDD)}
Configuration A-3 {PCell(FDD), SCell-0(FDD), SCell-1(TDD), SCell-2(FDD or TDD)}
Configuration A-4 {PCell(FDD), SCell-0(TDD), SCell-1(FDD), SCell-2(FDD or TDD)}
Configuration A-5 {PCell(FDD), SCell-0(TDD), SCell-1(FDD), SCell-2(FDD or TDD), SCell-3(FDD or TDD)}

When one carrier supporting TDD is set as a PCell and the remaining carriers (i.e., carriers supporting FDD or carriers supporting TDD except for the carrier which is set as the PCell) are configured as an SCell, the one carrier and the remaining carriers may be set to configure B-1, B-2, B-3, B-4, and B-5 as follows.

Configuration B-1 {PCell(TDD), SCell-0(FDD)}
Configuration B-2 {PCell(TDD), SCell-0(FDD), SCell-1(TDD or FDD)}
Configuration B-3 {PCell(TDD), SCell-0(TDD), SCell-1(FDD), SCell-2(TDD or FDD)}
Configuration B-4 {PCell(TDD), SCell-0(FDD), SCell-1(TDD), SCell-2(TDD or FDD)}
Configuration B-5 {PCell(TDD), SCell-0(FDD), SCell-1(TDD), SCell-2(TDD or FDD), SCell-3(TDD or FDD)}

When the relevant method is used and an SCell is added, a parameter may be explicitly added for indicating duplex modes of FDD and TDD in such a manner as to discriminate between the duplex modes of FDD and TDD. Alternatively, the relevant method enables recognition of whether the added SCell is an SCell supporting FDD duplex or an SCell supporting TDD duplex according to an implicitly-indicated DL carrier frequency.

Third Embodiment 3: an FDD-Prioritized PCell Definition Method

The third embodiment 3 is a method for first setting a CC supporting the FDD mode, as a PCell when performing a joint operation of TDD and FDD. In contrast, when a CC supporting the TDD mode first as a PCell, it is required to define respective timings for transmitting PUSCH/PDSCH/PHICH/UCI according to UL-DL subframe configuration which is set for a CC supporting the relevant TDD mode. Specifically, it is required to set the respective timings for transmitting PUSCH/PDSCH/PHICH/UCI between FDD and TDD. To this end, it is required to define a timing relation for each channel associated with FDD and TDD. On the other hand, when a CC supporting FDD is first set as a PCell in the third embodiment 3, a UL carrier exists as a frequency resource independent of a DL carrier in FDD differently from TDD in which a DL subframe and a UL subframe exist on an identical carrier. Accordingly, with respect to transmission of UCI as feedback transmission of a PDSCH transmitted in TDD, the relevant UCI may be transmitted through a PUCCH or a PUSCH in a UL subframe on a UL carrier used in the relevant FDD, and thus it is not necessary to change legacy UEs. Therefore, as compared with the method for defining/setting/designating a PCell with TDD as first priority, without largely changing the existing technical configuration, the third embodiment 3 enables the UE, which supports a joint operation and CA of TDD and FDD proposed in Embodiment 3, to support a joint operation and CA of TDD and FDD through only the configuration for defining/setting/designating a PCell with FDD as first priority when the UE just operates in a network capable of supporting the relevant joint operation and CA of TDD and FDD.

A method according to embodiments of the present disclosure can be applied when a Pcell is not separately configured for each duplex mode, similar to the methods for designating a Pcell according to the second embodiment 2 and the third embodiment 3. That is, in accordance with embodiments of the present disclosure, a method may be provided for setting a relevant CC to be capable of performing some of functions of a PCell with respect to a lowest SCell index from among SCell indices supporting a relevant duplex mode when CCs having different duplex modes are aggregated and even when the relevant CC is an SCell in the case of CCs having different duplex modes.

In accordance with embodiments of the present disclosure, the method may set a Scell to have functions as follows: 1) a function of transmitting a PUCCH; 2) a function of performing cross-carrier scheduling; 3) a function of transmitting a random access response when non-contention based random access procedure is performed; and 4) a function enabling the execution of cross-carrier scheduling by an SCell having a lowest SCell index in an identical duplex mode among CCs which are set as SCells when a relation between a PCell and an SCell in different duplex modes is configured. Also, such a method may set the Scell not to be applied with cross-carrier scheduling. Specifically, the relevant SCell may be set to be scheduled only by self-carrier scheduling, similarly to a method for setting a PCell not to be capable of being cross-carrier scheduled by another SCell. Based on a method of setting a PCell and an SCell according to the second embodiment 2, the above-described relevant SCell corresponds to the above-proposed case where FDD is designated for a PCell. In examples A-1 to A-5, an SCell having a lowest SCell index in the case of CCs supporting the TDD mode is SCell-0(TDD) in the case of A-1, is SCell-0(TDD) in the case of A-2, is SCell-1 (TDD) in the case of A-3, is SCell-0(TDD) in the case of A-4, and is SCell-0(TDD) in the case of A-5. In examples B-1 to B-5 where TDD is designated for a PCell as described above, an SCell having a lowest SCell index in the case of CCs supporting the FDD mode is SCell-0(FDD) in the case of B-1, is SCell-0(FDD) in the case of B-2, is SCell-1(FDD) in the case of B-3, is SCell-0(FDD) in the case of B-4, and is SCell-0(FDD) in the case of B-5.

When a PCell is set and an SCell is configured regardless of a duplex mode, with respect to the above-proposed some functions, such a method enables operations of a UE and a BS, which are independently used in TDD-only and FDD-only, to be also independently performed in the case of a joint operation and CA of TDD and FDD, and thus may be considered as a method for solving the ambiguity of the operations of the BS and the UE according to the joint operation of TDD and FDD.

According to embodiments of the present disclosure, the following two methods may be provided for designating an SCell index, as a method for designating a PCell when a joint operation and CA of TDD and FDD are performed. Such a method can be applied to all of the first embodiment 1, the second embodiment 2, and the third embodiment 3 of the present disclosure.

Embodiment A: A Method for Independently Setting an SCell Index for Each Duplex Mode, Namely, for Each of a FDD Mode and a TDD Mode The relevant method configures an SCell index between CCs supporting the FDD mode, and configures an SCell index between CCs supporting the TDD mode. When the UE, a network, and the BS operate under a joint operation and CA of TDD and FDD, the relevant method enables the UE and the BS to be independently operated although the UE and the BS were operated independently in TDD-only and FDD-only, Thus, such a method may solve the ambiguity problem in the operations of the BS and the UE according to the joint operation of TDD and FDD.

Embodiment B: A Method for Setting an SCell Index According to a Configuration of a Relevant Carrier Regardless of a Duplex Mode or without Separately Discriminating Between Duplex Modes The relevant method sets an SCell index to be designated between CCs configured for a UE without discriminating between SCell indices according to a duplex mode when an SCell index is assigned between CCs supporting the FDD and TDD modes. Specifically, in the relevant method, the BS sets an SCell index without discriminating between duplex modes when one CC is added as an SCell. For example, a CC is set to have an index of SCell-0 when FDD configures a PCell and the relevant CC supporting the TDD mode or when the FDD mode is additionally added as an SCell. One more CC is set to have an index of SCell-1 when the relevant CC supporting the TDD mode or when the FDD mode is further added as an SCell. Similarly, a CC is set to have an index of SCell-0 when TDD configures a PCell and the relevant CC supporting the FDD mode or the TDD mode is additionally added as an SCell. One more CC is set to have an index of SCell-1 when the relevant CC supporting the FDD mode or when the TDD mode is further added as an SCell.

[A Method and an Apparatus for Setting CA]

Hereinafter, a method for setting an SCell by a UE will be described. In particular, description will be made of a method for independently setting respective SCell indices for each of FDD and TDD modes and a method for setting the SCell index based on a configuration of a carrier regardless of the FDD and TDD modes, in the case of a joint operation and CA of FDD and TDD, which are duplex modes. Also, one of the carriers, which are set as the SCells, may perform some of functions of a PCell.

Figure 8:
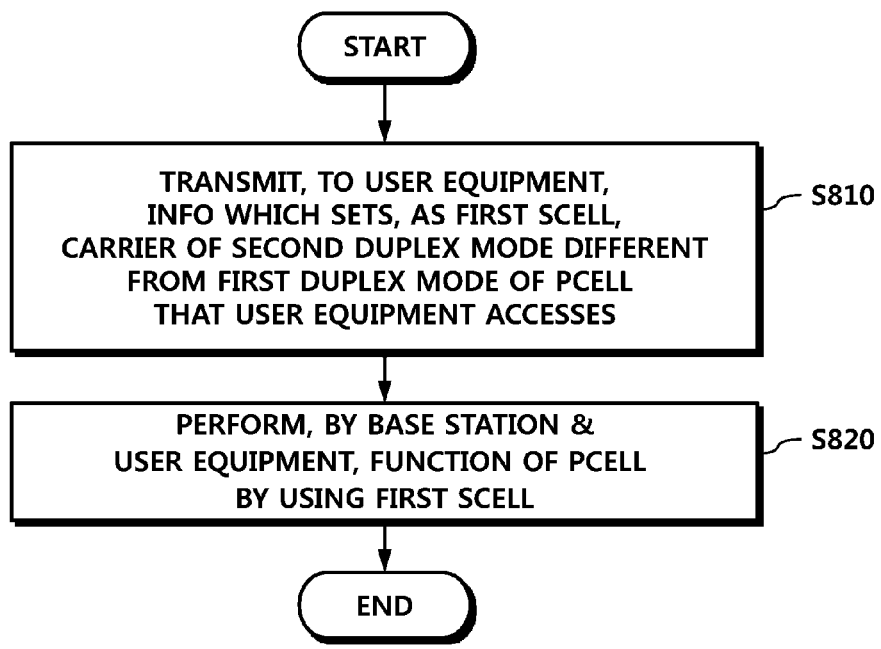
FIG. 8 is a view illustrating a process for setting an SCell in different duplex modes by a base station according to an embodiment of the present disclosure.

FIG. 8 is a view illustrating a process for setting an SCell in different duplex modes by a BS according to an embodiment of the present disclosure.

In step S810, the BS transmits, to the UE, information which sets, as a first SCell, a carrier of a second duplex mode different from a first duplex mode of a PCell that the UE accesses. In step S820, the BS and the UE performs a function of a PCell by using the first SCell. The above-described SCell performing a function of a PCell is set and the SCell is in a duplex mode different from that of the PCell. The function of the PCell may be the transmission/reception of a PUCCH, cross-carrier scheduling, and the transmission/reception of a random access response, as described above. Also, the first SCell may be self-carrier scheduled. The first Scell may be set not to be cross-carrier scheduled when the first SCell performs one or more of the functions of the PCell. When one PCell is set for the UE regardless of a duplex mode, the first SCell may perform cross-carrier scheduling for another SCell.

Meanwhile, the first SCell may be set to have a lowest SCell index. Specifically, the SCell having the lowest SCell index may be set to perform the function of the PCell.

Also, as in Embodiment A, respective SCell indices may be independently assigned for each duplex mode. The BS further includes a step of independently setting indices of one or more SCells of the first duplex mode and indices of one or more SCells of the second duplex mode. A case in which independent SCell indices are assigned will be described with reference to FIGS. 9 and 11.

In contrast, as in Embodiment B, an SCell index may be assigned without discriminating between duplex modes. The BS further performs operations of setting indices of one or more SCells of the first duplex mode and indices of one or more SCells of the second duplex mode without discriminating between duplex modes. A method for assigning an SCell index without discriminating between duplex modes will be described with reference to FIG. 10 and FIG. 12.

Meanwhile, according to the first embodiment 1 is applied, the BS may set one carrier of the second duplex mode as a second PCell distinguished from the PCell. Also, the BS may set one carrier of the first duplex mode as a second SCell distinguished from the first SCell.

Referring to FIG. 8, a method for setting the first SCell and a method for setting the second PCell and the second SCell include transmitting, by the BS, setting information through various signaling, such as RRC signaling, Medium Access Control (MAC) Control Element (CE) signaling, and the like, and receiving, by the UE, the setting information.

Hereinafter, setting a Scell according to the second and third embodiments 2 and 3 and the embodiments A and B of the present disclosure will be described.

Figure 9:
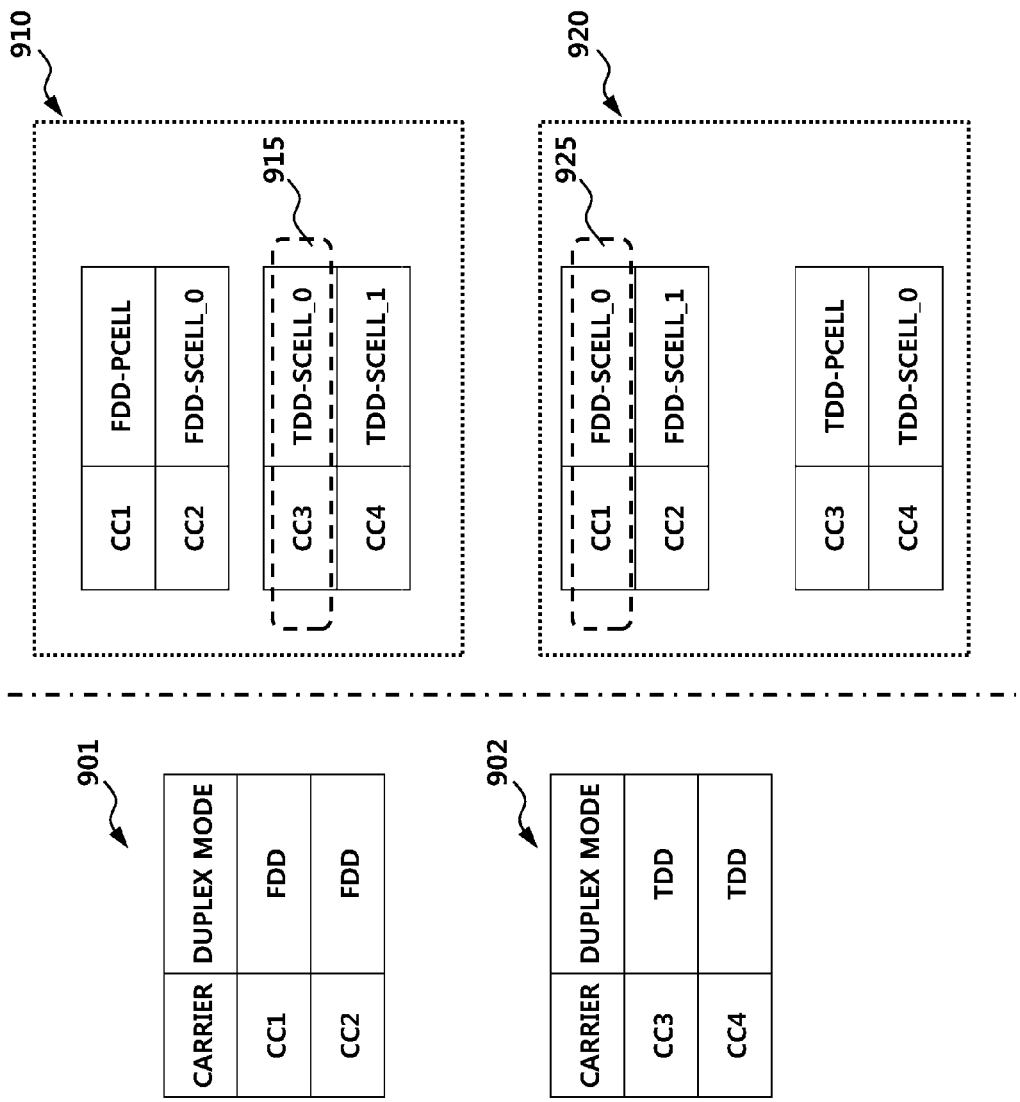
FIG. 9 is a view illustrating the setting of an SCell performing a function of a PCell according to a second embodiment 2 and an embodiment A of the present disclosure.

FIG. 9 is a view illustrating the setting of an SCell performing a function of a PCell when the second embodiment 2 and the embodiment A of the present invention are applied. FIG. 9 illustrates the application of the embodiment A in which an SCell index is independently used in the respective duplex modes according to an embodiment of the present disclosure.

When a BS operates CC1 and CC2 as FDD carriers and when the BS operates CC3 and CC4 as TDD carriers (as indicated by reference numerals 901 and 902), reference numeral 910 indicates a result of setting FDD and TDD by a UE 1 supporting different duplex modes and a result of setting a PCell/SCell by the UE 1. Also, reference numeral 920 indicates a result of setting FDD and TDD by a UE 2 and a result of setting a PCell/SCell by the UE 2.

The UE 1 sets FDD-PCell for CC1 and sets TDD-SCell_0 (as indicated by reference numeral 915) of CC3 having a lowest index among SCells of TDD, which is a duplex mode different from FDD, to become the above-described first SCell performing the function of the PCell.

The UE 2 sets TDD-PCell for CC3, and sets FDD-SCell_0 (as indicated by reference numeral 925) of CC1 having a lowest index among SCells of FDD, which is a duplex mode different from TDD, to become the above-described first SCell performing the function of the PCell.

Figure 10:
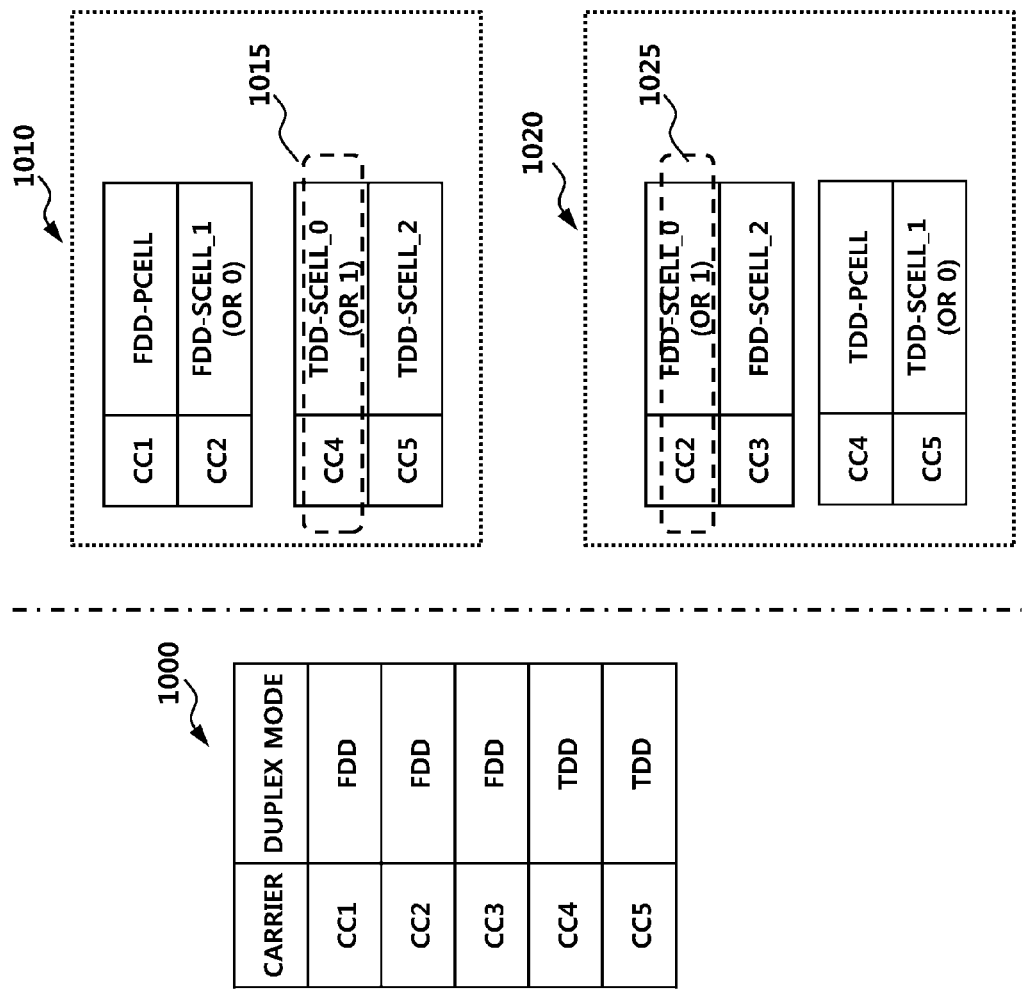
FIG. 10 is a view illustrating the setting of an SCell performing a function of a PCell according to a second Embodiment 2 and an Embodiment B of the present disclosure.

FIG. 10 is a view illustrating the setting of an SCell performing a function of a PCell when the second embodiment 2 and the embodiment B of the present disclosure are applied. FIG. 10 illustrates the application of Embodiment B when an SCell index is used without discriminating between duplex modes.

When a BS operates CC1, CC2, and CC3 as FDD carriers, and operates CC4 and CC5 as TDD carriers (as indicated by reference numerals 1000), reference numeral 1010 indicates a result of setting FDD and TDD by a UE 1 supporting different duplex modes and a result of setting a PCell/SCell by the UE 1. Also, reference numeral 1020 indicates a result of setting FDD and TDD by a UE 2 and a result of setting a PCell/SCell by the UE 2.

The UE 1 sets FDD-PCell for CC1 and sets TDD-SCell_0 (as indicated by reference numeral 1015) of CC4 having a lowest index among SCells of TDD, which is a duplex mode different from FDD, to become the above-described first SCell performing the function of the PCell. As another embodiment, an SCell index of CC2 may be FDD-SCell_0, and an SCell index of CC4 may be TDD-SCell_1.

The UE 2 sets TDD-PCell for CC4 and sets FDD-SCell_0 (as indicated by reference numeral 1025) of CC2 having a lowest index among SCells of FDD, which is a duplex mode different from TDD, to become the above-described first SCell performing the function of the PCell. As another embodiment, an SCell index of CC2 may be FDD-SCell_1, and an SCell index of CC5 may be TDD-SCell_0.

Figure 11:
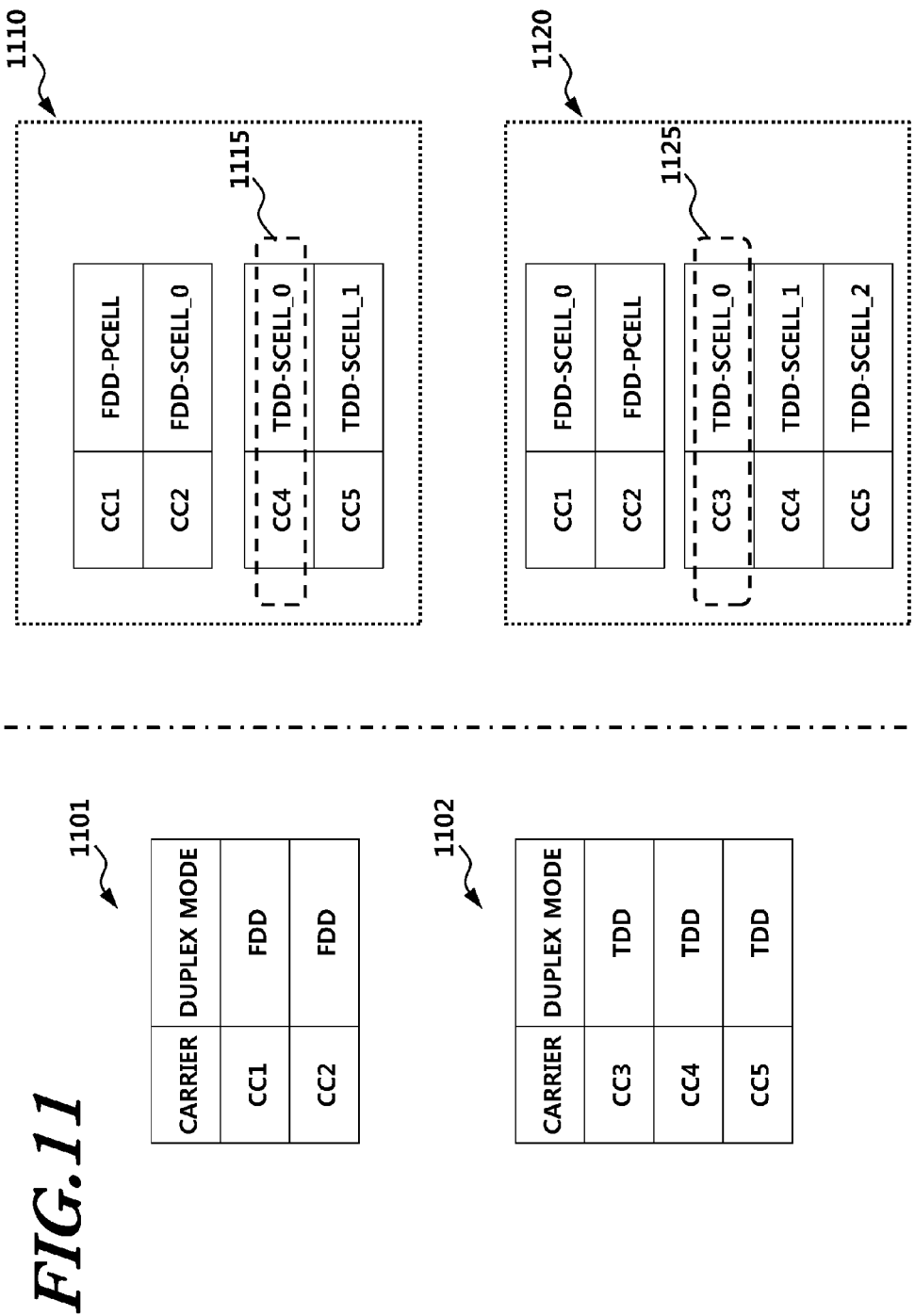
FIG. 11 is a view illustrating the setting of an SCell performing a function of a PCell according to a third embodiment 3 of the present disclosure.

FIG. 11 is a view illustrating the setting of an SCell performing a function of a PCell when Embodiment 3 of the present disclosure is applied. FIG. 11 illustrates the application of Embodiment A when an SCell index is independently used in the respective duplex modes.

Referring to FIG. 11, carriers of FDD are configured as CC1 and CC2 independently of TDD, as indicated by reference numeral 1101, and carriers of TDD are also configured as CC3, CC4, and CC5 independently of FDD independently of FDD, as indicated by reference numeral 1102.

A UE 1 sets FDD-PCell for CC1 as indicated by reference numeral 1110. CC4 and CC5 are in TDD which is not FDD and TDD-SCell_0 of CC4 having a lowest SCell index is a first SCell as indicated by reference numeral 1115 and performs a function of a PCell.

A UE 2 sets FDD-PCell for CC2 as indicated by reference numeral 1120. CC3, CC4, and CC5 are in TDD which is not FDD, and TDD-SCell_0 of CC3 having a lowest SCell index is a first SCell as indicated by reference numeral 1125 and performs a function of a PCell.

Figure 12:
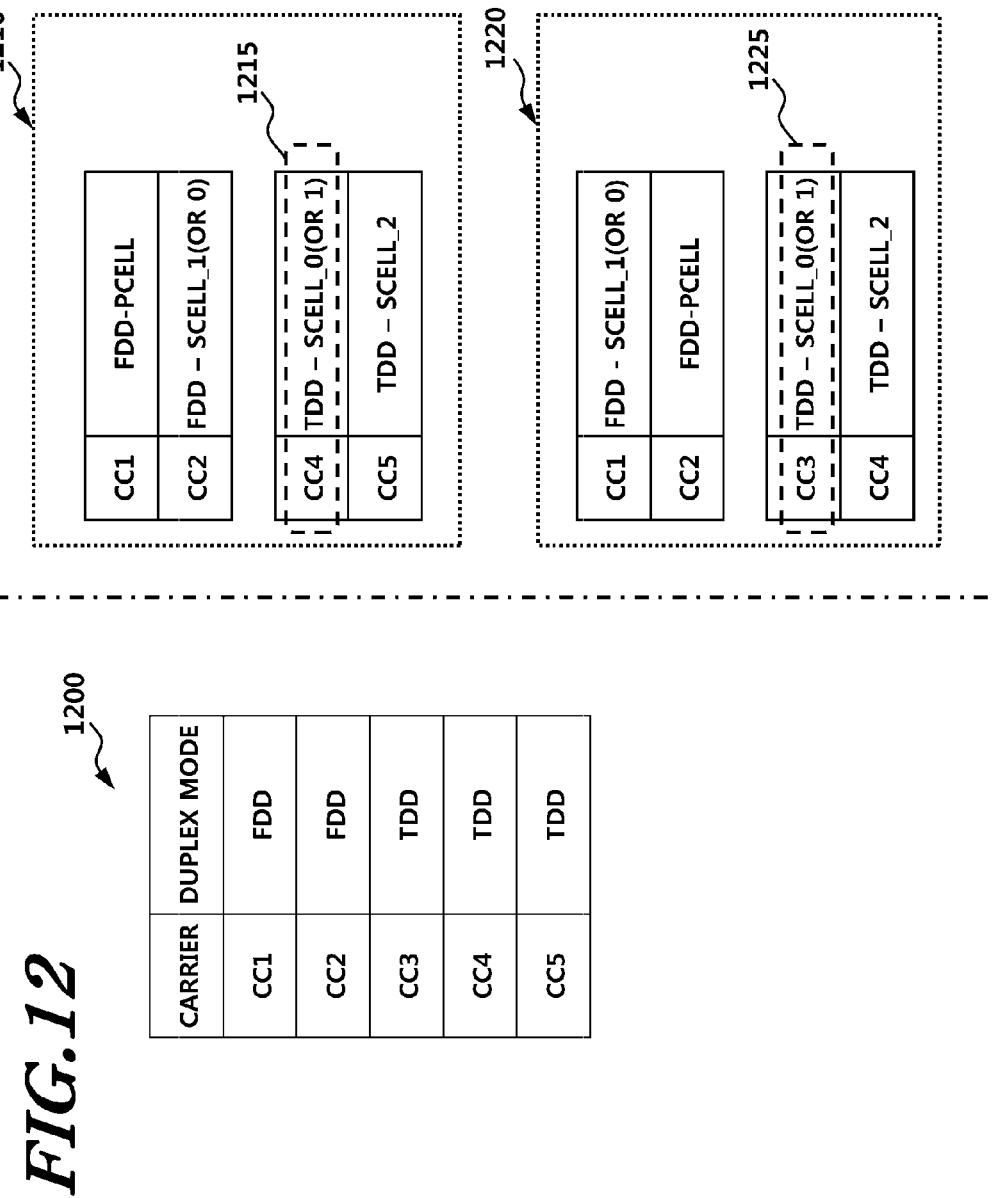
FIG. 12 is a view illustrating the setting of an SCell performing a function of a PCell according to the third Embodiment 3 of the present disclosure.

FIG. 12 is a view illustrating the setting of an SCell performing a function of a PCell when the third embodiment 3 of the present disclosure is applied. FIG. 12 illustrates the application of Embodiment B when an SCell index is set without discriminating between duplex modes.

Referring to FIG. 12, as indicated by reference numeral 1200, carriers of FDD are configured as CC1 and CC2, and carriers of TDD are configured as CC3, CC4, and CC5.

A UE 1 sets FDD-PCell for CC1, as indicated by reference numeral 1210. CC4 and CC5 are in TDD which is not FDD, and CC4 having a lowest SCell index is a first SCell as indicated by reference numeral 1215 and performs a function of a PCell.

A UE 2 sets FDD-PCell for CC2 as indicated by reference numeral 1220. CC3 and CC4 are in TDD which is not FDD, and CC3 having a lowest SCell index is a first SCell as indicated by reference numeral 1225 and performs a function of a PCell.

In FIG. 9 to FIG. 12, the UE 1 and the UE 2 are for expressing that the UE 1 and the UE 2 may be set to UE-specifically configure a PCell and an SCell. The UE 1 may be different from the UE 2 with respect to the setting of a PCell and the configuration of an SCell. However, this configuration does not imply that the UE 1 may always be different from the UE 2 with respect to the setting of a PCell and the configuration of an SCell, but the UE 1 may be identical to the UE2 with respect to the setting of a PCell and the configuration of an SCell, according to the operation of a network.

Figure 13:
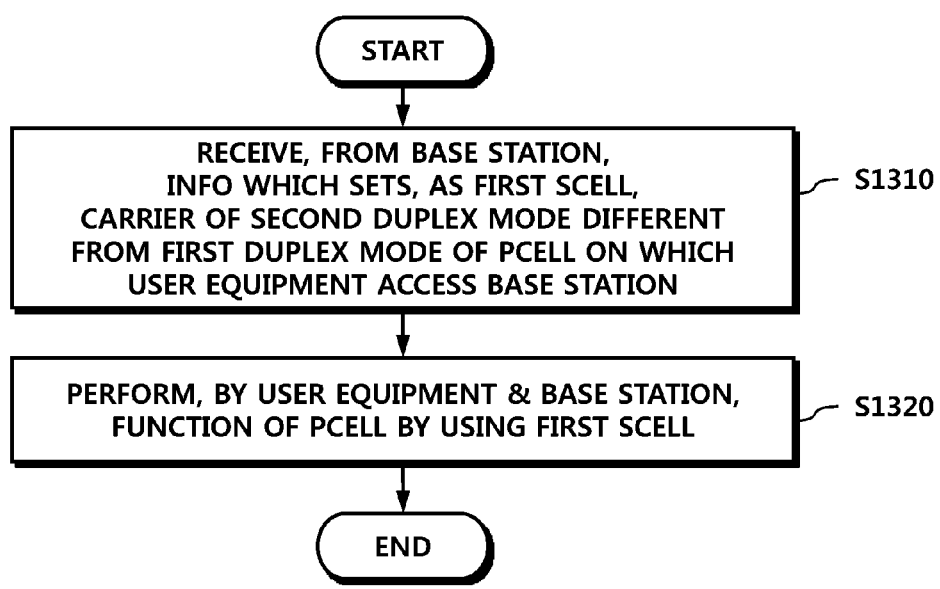
FIG. 13 is a view illustrating an operation of a user equipment according to an embodiment of the present disclosure.

FIG. 13 is a view illustrating an operation of a UE according to an embodiment of the present disclosure. As illustrated in FIG. 13, the UE performs an operation to set an SCell in different duplex modes. In step S1310, the UE receives, from the BS, information which sets, as a first SCell, a carrier of a second duplex mode different from a first duplex mode of a PCell on which the UE access the BS. In step S1320, the UE and the BS performs a function of a PCell by using the first SCell.

More specifically, the function of the PCell signifies the execution of one or more of the transmission/reception of a PUCCH, cross-carrier scheduling, and the transmission/reception of a random access response. Also, the first SCell may be set to be self-carrier scheduled. Also, the first SCell may be configured to have a lowest SCell index. Additionally, when the first SCell performs one or more of the functions of the PCell, the first SCell may be set not to be cross-carrier scheduled.

As an example of the embodiment A in which an independent SCell index is assigned in the respective duplex modes, the setting of indices of one or more SCells of the first duplex mode may be independent of that of indices of one or more SCells of the second duplex mode. This configuration has been described with reference to FIG. 9 and FIG. 11.

In contrast, as in the embodiment B, indices of one or more SCells of the first duplex mode and indices of one or more SCells of the second duplex mode are set without discriminating between duplex modes. Assigning of an SCell index without discriminating between duplex modes have been described with reference to FIG. 10 and FIG. 12.

Meanwhile, when the first embodiment 1 is applied, one carrier of the second duplex mode may be set as a second PCell distinguished from the PCell, and one carrier of the first duplex mode may be set as a second SCell distinguished from the first SCell.

Referring to FIG. 13, the method of setting of the first SCell or the method of setting of the second PCell and the second SCell includes transmitting, by the BS, setting information through various signaling, such as RRC signaling, MAC CE signaling, and the like, and receiving, by the UE, the setting information.

When CA is performed by using carriers having the different TDD and FDD modes, ambiguity is solved between the UE and the BS regarding an operation of the UE, which operates according to the setting of a PCell between the UE and the BS, and a setting by the BS. Accordingly, accuracy is achieved for an access procedure, UL/DL data transmission, and an operation of transmission/reception of a UL/DL control channel including an HARQ operation, which are performed between the UE and the BS, and thereby the reliability of data transmission between the UE and the BS can be ensured. As a result, a data transmission rate in UL/DL can be increased.

Figure 14:
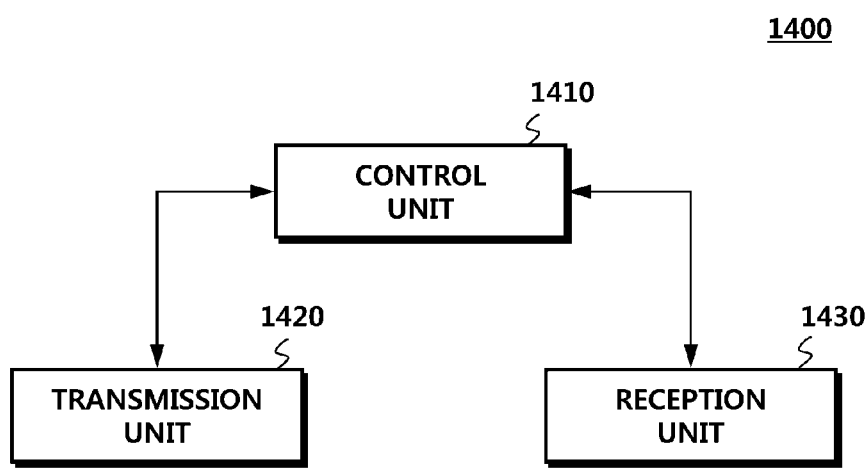
FIG. 14 is a view illustrating a configuration of a base station according to an embodiment of the present disclosure.

FIG. 14 is a view illustrating a configuration of a BS according to an embodiment of the present disclosure.

Referring to FIG. 14, the BS 1400 according to an embodiment of the present disclosure includes a control unit 1410, a transmission unit 1420, and a reception unit 1430.

The control unit 1410 controls an overall operation of the BS according to the setting of an SCell which considers a joint operation and CA of FDD and TDD in different duplex modes required to perform the above-described present.

In a method for setting an SCell by the UE required to perform the above-described embodiments of the present disclosure, the control unit 1410 controls an overall operation of the BS for designating a PCell/SCell according to different duplex modes, which may be applied regardless of a duplex mode when CA, a joint operation, and a dual connectivity are performed in an environment of different macrocell and small cell (or macro eNB and small cell eNB).

The transmission unit 1420 and the reception unit 1430 are used to transmit and receive signals, messages, and data, which are required to perform the above-described present, to/from the UE.

More specifically, the configuration of the BS 1400 for setting an SCell in different duplex modes includes the reception unit 1430 that performs reception in UL from the UE; the control unit 1410 that generates information which sets, as a first SCell, a carrier of a second duplex mode different from a first duplex mode of a PCell that the UE accesses; and the transmission unit 1420 that transmits the generated information to the UE. The control unit 1410 controls the transmission unit 1420 and the reception unit 1430 in such a manner that the transmission unit 1420 and the reception unit 1430, and the UE perform a function of a PCell by using the first SCell.

As described, the SCell performing a function of a PCell is set and is in a duplex mode different from a duplex mode of the PCell. The control unit 1410 may perform one or more of the transmission/reception of a PUCCH, cross-carrier scheduling, and the transmission/reception of a random access response, which are the functions of the PCell, by using the first SCell. Also, the first SCell may be self-carrier scheduled and may be set not to be cross-carrier scheduled when the first SCell performs one or more of the functions of the PCell. When one PCell is set for the UE regardless of a duplex mode, the first SCell may perform cross-carrier scheduling for another SCell.

Meanwhile, the first SCell may be set to have a lowest SCell index. Specifically, an SCell have the lowest SCell index may be set to perform a function of a PCell.

Also, as in the embodiment A, the respective SCell indices may be independently assigned for each duplex mode. The control unit 1410 may set indices of one or more SCells of the first duplex mode to be independent of the setting of indices of one or more SCells of the second duplex mode. Such assigning of independent SCell indices has been described with reference to FIG. 9 and FIG. 11.

In contrast, as in the embodiment B, an SCell index may be assigned without discriminating between duplex modes. The control unit 1410 may set indices of one or more SCells of the first duplex mode and indices of one or more SCells of the second duplex mode, without discriminating between duplex modes. Such assigning of an SCell index without discriminating between duplex modes has been described with reference to FIG. 10 and FIG. 12.

Meanwhile, when the first embodiment 1 is applied, the control unit 1410 may set one carrier of the second duplex mode as a second PCell distinguished from the PCell. Also, the control unit 1410 may set one carrier of the first duplex mode as a second SCell distinguished from the first SCell.

Referring to FIG. 14, the transmission unit 1420 may transmit setting information on the setting of the first SCell or information on the setting of the second PCell and the second SCell through various signaling operations, such as RRC signaling, MAC CE signaling, and the like, and the UE may receive the setting information.

Figure 15:
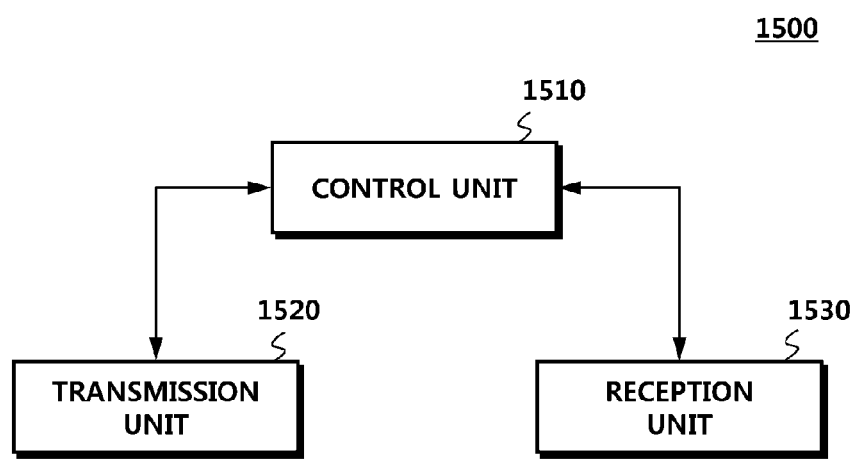
FIG. 15 is a view illustrating a configuration of a user equipment according to an embodiment of the present disclosure.

FIG. 15 is a view illustrating a configuration of a UE according to an embodiment of the present disclosure.

Referring to FIG. 15, the UE 1500 according to an embodiment of the present disclosure includes a reception unit 1530, a control unit 1510, and a transmission unit 1520.

The reception unit 1530 receives DL control information, DL data, and a message through a relevant channel from the BS.

Also, the control unit 1510 controls an overall operation of the UE according to the setting of an SCell which considers a joint operation and CA of FDD and TDD in different duplex modes required to perform the above-described present.

Further, in a method for setting an SCell by the UE required to perform the above-described embodiments of the present disclosure, the control unit 1510 controls an overall operation of the UE for designating a PCell/SCell according to different duplex modes, which may be applied regardless of a duplex mode when CA, a joint operation, and a dual connectivity are performed in an environment of different macrocell and small cell (or macro eNB and small cell eNB).

The transmission unit 1520 transmits UCI, UL data, and a message through a relevant channel to the BS.

The configuration of the UE 1500 for setting an SCell in different duplex modes includes the transmission unit 1520 that performs transmission in UL to the BS; the reception unit 1530 that receives, from the BS, information which sets, as a first SCell, a carrier of a second duplex mode different from a first duplex mode of a PCell on which the UE accesses the BS; and the control unit 1510 that controls the transmission unit 1520 and the reception unit 1530 in such a manner that the transmission unit 1520 and the reception unit 1530, and the BS perform a function of a PCell by using the first SCell.

More specifically, the control unit 1510 may perform one or more of the transmission/reception of a PUCCH, cross-carrier scheduling, and the transmission/reception of a random access response, which are the functions of the PCell, by using the first SCell. Also, the first SCell may be set to be self-carrier scheduled and may be set not to be cross-carrier scheduled when the first SCell performs one or more of the functions of the PCell. Further, the first SCell may be configured to have a lowest SCell index.

As an example of the embodiment A in which an independent SCell index is assigned, the control unit 1510 may set indices of one or more SCells of the first duplex mode to be independent of the setting of indices of one or more SCells of the second duplex mode. Such assigning of independent SCell indices has been described with reference to FIG. 9 and FIG. 11.

In contrast, as in the embodiment B, the control unit 1510 may set indices of one or more SCells of the first duplex mode and indices of one or more SCells of the second duplex mode, without discriminating between duplex modes. Such assigning of an SCell index without discriminating between duplex modes has been described with reference to FIG. 10 and FIG. 12.

Meanwhile, when the first embodiment 1 is applied, the control unit 1510 may set one carrier of the second duplex mode as a second PCell distinguished from the PCell, and the control unit 1510 may set one carrier of the first duplex mode as a second SCell distinguished from the first SCell.

Referring to FIG. 15, the BS may transmit setting information on the setting of the first SCell or information on the setting of the second PCell and the second SCell through various signaling operations, such as RRC signaling, MAC CE signaling, and the like, and the reception unit 1530 may receive the setting information.

The above-described embodiments in this specification provide the operating method and the apparatus of the BS, and the operating method and the apparatus of the UE, which set an SCell when the BS considers a joint operation and CA of FDD and TDD, which are different duplex modes, with respect to the UE.

Also, according to embodiments of the present disclosure, the method is provided for enabling the UE to independently set respective SCell indices for each of the FDD and TDD modes or to set the SCell index on the basis of a configuration of a carrier regardless of the FDD and TDD modes in the case of a joint operation and CA of FDD and TDD which are duplex modes.

[A Method and an Apparatus for Controlling CA in a Small Cell Environment]

In the present disclosure, the above-proposed method for designating a PCell/SCell according to different duplex modes may be applied regardless of a duplex mode when CA and a joint operation are performed in an environment of different macrocell and small cell (or macro eNB and small cell eNB), and more specifically, a method described below may be considered.

According to an embodiment 4 similarly to the first embodiment 1 which sets CA to be independently performed for each of duplex modes, a method may be provided for defining a PCell depending on a BS type so as to enable CA to be independently performed for each of different BSs. Specifically, the method enables a PCell to be designated for each of eNBs of different types and enables an operation of the UE to be performed on a PCell described by the present disclosure, when the respective macro eNB and small cell eNB are set.

In other words, the relevant method may be provided for defining a PCell depending on a BS and for allowing the designation of a PCell for each of eNBs of different types when, with respect to a CC configured for a UE, a carrier belonging to a macro BS is set as one or more multiple CCs and a carrier of a small cell BS is set as one or more multiple CCs.

The method allows each of a macro BS and a small cell BS to follow operations of a PCell and SCells designated for each of the relevant BSs when each of the macro BS and the small cell BS transmits DL control/data and UL control/data. The method also defines operations of a PCell and SCells, which transmit HARQ-ACK/NACK and UCI as feedback of DL data, to follow operations of the UE and the BS according to a PCell and SCells, according to the setting by each BS. In the aspect of transmitting a PUCCH in UL under the relevant CA, the method enables UCI to be transmitted by using a method for transmitting a PUCCH defined for each BS type on only a PCell. Also, the method enables the use of a method which, as rules as to which relevant CCs (i.e., a PCell or an SCell) are used to transmit UCI when the UCI piggybacks on a PUSCH, allows the UCI to be transmitted through a PUSCH of a PCell when the PCell includes the PUSCH, and which allows the UCI to be transmitted through a PUSCH of an SCell having the lowest index among SCells when the PCell does not include a PUSCH but the relevant SCells include the PUSCH. Alternatively, use may be made of a method which, when an aperiodic CSI request is designated by the BS, sets UCI to be transmitted through a PUSCH of a PCell or an SCell of the relevant BS which is indicated by a UL grant indicating the relevant aperiodic CSI request.

Also, when a macrocell and a small cell (or a macro BS and a small cell BS) perform a joint operation and CA in an identical duplex mode or different duplex modes, in an aspect of the transmission of a PUSCH, the transmission of a PDSCH, and the transmission of a PUSCH under the CA, the method may set the PDSCH and the PUSCH to be capable of being transmitted according to an operating method of the UE and an operating method of the BS under controlling a PCell defined in each BS.

Finally, the method may minimize the effect, such as compatibility between legacy systems, when comparing a first case where an operation of the UE and a setting by the BS support a FDD-duplex-mode-only under CA in a single BS with a second case where the operation of the UE and the setting by the BS support a TDD-duplex-mode-only under CA, when the operation of the UE and the setting by the BS are performed by using a method used in a single BS during CA in each of the FDD and TDD modes or the TDD mode in defining operations of the UE and the BS in each of a macro BS and a small cell BS by identically using the concept of the first embodiment 1. Specifically, since there exists an operation as a PCell according to each of the macro BS and the small cell BS, an operation of the UE and an operation of the BS may be performed independently between BSs, according to operations of a PCell and an SCell defined for each BS type. Accordingly, when a PCell is defined/designated/set according to the relevant setting, the method enables a dual connectivity, a joint operation, or CA to be performed in the macro BS and the small cell BS while minimizing the effect such as compatibility between legacy systems.

However, in the case of the relevant method, when an access procedure (e.g., a cell search procedure, a random access procedure, a handover procedure, etc.) is performed, a scheme may be provided for allowing the macro BS to be first set as a BS, which first performs access, and for allowing the access procedure to be performed according to the setting of the relevant PCell. In this case, the scheme allows the access procedure to follow the relevant PCell according to whether a synchronization channel used in the macro BS is first detected or whether a synchronization channel used in the small cell BS is first detected, when a cell search is performed by the UE.

As another method, a method may be provided for setting a priority to be assigned to a particular macro BS and a particular small cell BS, for example, assigns a priority to a macro BS when an LTE network is conventionally deployed by using the relevant macro BS and sufficient coverage and mobility support are provided, and which allows the access procedure to be performed. Alternatively, another method may be provided for assigning a priority to the small cell BS and allowing the access procedure to be performed when sufficient coverage and mobility support are provided by the relevant small cell BS differently from the above-described case. This method can solve ambiguity between the UE and the BS which may occur in the access procedure according to the setting of a PCell between different BS types.

That is, the method according to the fourth embodiment 4 enables the UE to perform a non-CA operation and a CA operation in the macro BS and a non-CA operation and a CA operation in the small cell BS when the UE accesses a network capable of supporting a dual connectivity although the UE does not support CA and a joint operation of the macro BS and the small cell BS, and the relevant dual connectivity therebetween.

Although a method according to the fifth embodiment 5 supports CA of a macro BS and a small cell BS and a dual connectivity therebetween similarly to the second embodiment 2, the method according to the fifth embodiment 5 may be provided for setting the use of a scheme which, with respect to the setting of a PCell and an SCell, configures one PCell as in an existing scheme for performing a setting by one BS, and configures the remaining CCs as SCells. An embodiment in the relevant case is as follows.

When one carrier supporting a macro BS is set as a PCell and the remaining carriers (i.e., carriers except for the carrier which is set as the PCell) of the macro BS and a small cell BS are configured as an SCell, configurations of X-1, X-2, X-3, X-4, and X-5 will be described below.

Configuration X-1 {PCell(macro), SCell-0(small cell)}

Configuration X-2 {PCell(macro), SCell-0(small cell), SCell-1(macro or small cell)}

Configuration X-3 {PCell(macro), SCell-0(small cell), SCell-1(small cell), SCell-2(macro or small cell)}

Configuration X-4 {PCell(macro), SCell-0(small cell), SCell-1(macro), SCell-2(macro or small cell)}

Configuration X-5 {PCell(macro), SCell-0(small cell), SCell-1(macro), SCell-2(macro or small cell), SCell-3 (macro or small cell)}

When one carrier supporting a small cell BS is set as a PCell and the remaining carriers (i.e., carriers except for the carrier which is set as the PCell) of a macro BS and the small cell BS are configured as an SCell, configurations of Y-1, Y-2, Y-3, Y-4, and Y-5 will be described below.

Configuration Y-1 {PCell(Small cell), SCell-0(macro)}

Configuration Y-2 {PCell(Small cell), SCell-0(macro), SCell-1(Small cell or macro)}

Configuration Y-3 {PCell(Small cell), SCell-0(small cell), SCell-1(macro), SCell-2(Small cell or macro)}

Configuration Y-4 {PCell(Small cell), SCell-0(macro), SCell-1(Small cell), SCell-2(Small cell or macro)}

Configuration Y-5 {PCell(Small cell), SCell-0(macro), SCell-1(Small cell), SCell-2(Small cell or macro), SCell-3(Small cell or macro)}

When the relevant method is used and a CC of the small cell BS or the macro BS is added, it may be necessary to explicitly add a parameter for indicating a BS type in such a manner as to discriminate between types of a macrocell and a small cell. Alternatively, the relevant method enables recognition of which carrier is an SCell supporting each BS type, according to an implicitly-indicated DL carrier frequency.

According to a sixth embodiment 6, a method may be provided for defining a PCell in such a manner as to assign a priority to a carrier of a macro BS.

The method of the sixth embodiment sets a PCell in such a manner as to assign a priority to a CC of a macro BS when CA and a joint operation of the macro BS and a small cell BS, and a dual connectivity therebetween are supported. When a PCell is set in such a manner as to assign a priority to a small cell, a CC of the relevant small cell BS may have less sufficient robust mobility than that of the previously-deployed macrocell BS, and a problem may occur in the transmission/reception of data in UL/DL by the UE, such as a case where, in a particular area, a coverage hole and the like are found and a Radio Link Failure (RLF) occurs, and the like. Accordingly, a method selects a PCell in such a manner as to assign a priority to a CC of the macro BS. Accordingly, the relevant problem can be prevented.

According to embodiments of the present disclosure, a method can be applied when the setting of a PCell is not separately configured for each BS type as in the methods according to the fifth embodiment 5 and the sixth embodiment 6 which are considered as a method for designating a PCell. When CCs supported by different BS types are supported by CA, a joint operation, and a dual connectivity, a method according to embodiments of the present disclosure may be provided for setting a relevant CC to be capable of performing some of functions of a PCell with respect to a lowest SCell index from among SCell indices supporting a relevant BS type even when the relevant CC is an SCell in the case of CCs of different BS types.

As an example, the relevant some functions may include: 1) a function of transmitting a PUCCH, 2) a function of performing cross-carrier scheduling, 3) a function of transmitting a random access response when non-contention based random access procedure is performed, 4) a function enabling the execution of cross-carrier scheduling by an SCell having a lowest SCell index among CCs of an identical BS type which are set as SCells when a relation between a PCell and an SCell of different BS types is configured. Also, the relevant some functions may be set such that cross-carrier scheduling cannot be applied to the relevant SCell. Specifically, the relevant SCell may be set to be scheduled only by self-carrier scheduling, similarly to setting a PCell not to be cross-carrier scheduled by another SCell. When the above-described relevant SCell is described based on the example of setting a PCell and an SCell which has been proposed by the fifth embodiment 5, the above-described relevant SCell corresponds to the above-proposed case where a carrier of a macro BS is designated as a PCell. In examples of X-1 to X-5, an SCell having a lowest SCell index in the case of CCs of a small cell BS is as follows.

In the case of configuration X-1, SCell-0(Small cell)
In the case of configuration X-2, SCell-0(Small cell)
In the case of configuration X-3, SCell-0(Small cell)
In the case of configuration X-4, SCell-0(Small cell)
In the case of configuration X-5, SCell-0(Small cell)

In examples of Y-1 to Y-5 where a CC of a small cell BS is designated as a PCell as described above, an SCell having a lowest SCell index in the case of CCs of a macro BS is as follows.

In the case of configuration Y-1, SCell-0(macro)
In the case of configuration Y-2, SCell-0(macro)
In the case of configuration Y-3, SCell-1(macro)
In the case of configuration Y-4, SCell-0(macro)
In the case of configuration Y-5, SCell-0(macro)

When a PCell is set and an SCell is configured regardless of the support of CA of a macrocell BS and a small cell BS and a dual connectivity therebetween and regardless of a duplex mode, with respect to the above-proposed some functions, such a method enables operations of a UE and a BS, which are independently used for CA in TDD-only and FDD-only without the support of the dual connectivity between the macrocell and the small cell, to be also independently performed in a network supporting a dual connectivity, and thus may be considered as a method capable of solving the ambiguity of the operations of the BS and the UE.

As a method for designating a PCell when UEs belonging to different BS types perform CA and a joint operation, namely, a method capable of being applied to all of the fourth embodiment 4, the fifth embodiment 5, and the sixth embodiment 6 proposed by the present disclosure, the present disclosure proposes the following two methods for designating an SCell index when the UEs belonging to different BS types perform the CA and the joint operation.

Embodiment C: A Method for Independently Setting an SCell Index for Each BS Type, Namely, for Each of a Macro BS and a Small Cell BS According to the relevant method, an SCell index is configured between CCs supported by a macro BS, and an SCell index is configured between CCs supported by a small cell BS. When the UE, a network, the BS operate under CA of a macro BS and a small cell BS, a joint operation thereof, and a dual connectivity therebetween, the relevant method enables the UE and the BS to independently operate although the UE and the BS support CA of BSs of different types and a dual connectivity therebetween. Thus, the ambiguity of each BS type and the operation of the UE can be solved.

Embodiment D: A Method for Setting an SCell Index According to a CC Configured for a UE Regardless of Respective BS Types or without Separately Discriminating Between BS Types The relevant method sets an SCell index to be designated between CCs configured for the UE without discriminating between SCell indices according to a BS type when an SCell index is assigned between CCs supported for each BS type. Specifically, in the relevant method, the BS sets an SCell index without discriminating between SCell indices according to a BS type when one CC is added as an SCell. For example, a CC is set to have an index of SCell-0 when a macro BS configures a PCell and the relevant CC of a small cell BS or a macro BS is additionally added as an SCell, and one more CC is set to have an index of SCell-1 when the relevant CC of the small cell BS or the macro BS is further added as an SCell. Similarly, a CC is set to have an index of SCell-0 when the small cell configures a PCell and the relevant CC of the macro BS or the small cell BS is additionally added as an SCell, and one more CC is set to have an index of SCell-1 when the relevant CC of the macro BS or the small cell BS is further added as an SCell.

As described in Embodiment C and Embodiment D, an SCell of the second BS is selected which performs all or some of the functions provided by a PCell of the first BS. The Scell of the second BS may perform the functions of the PCell, for example, the transmission of a PUCCH, the execution of cross-carrier scheduling, the transmission of a random access response of a non-contention based random access procedure, and the like.

Figure 16:
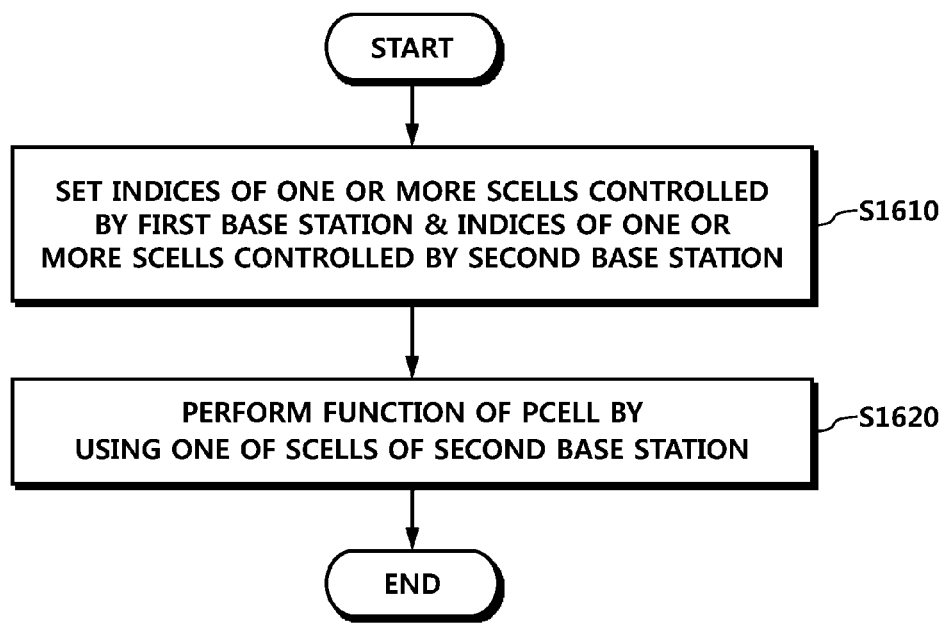
FIG. 16 is a view illustrating a process for controlling an SCell by a user equipment in a small cell environment according to another embodiment of the present disclosure.

FIG. 16 is a view illustrating a process for controlling an SCell by a UE in a small cell environment according to another embodiment of the present disclosure.

In step S1610, the UE sets indices of one or more SCells controlled by a first BS and indices of one or more SCells controlled by a second BS. In step S1620, the UE performs a function of a PCell by using one of SCells of the second BS. More specifically, the functions of the PCell may be a function of transmitting a PUCCH. In addition, the functions of the PCell may be a cross-carrier scheduling function, a function of receiving, by the UE, a random access response message in a non-contention based random access procedure, and the like.

Also, the SCell performing the function of the PCell may be set not to be cross-carrier scheduled.

The SCell indices may be independently set in step S1610 such that an SCell index of the first BS overlaps an SCell index of the second BS, by applying the independent setting scheme in Embodiment C. In a different scheme, the SCell indices may be set in step S1610 without discrimination such that an SCell index of the first BS does not overlap an SCell index of the second BS, by applying the setting scheme without discrimination in Embodiment D.

Figure 17:
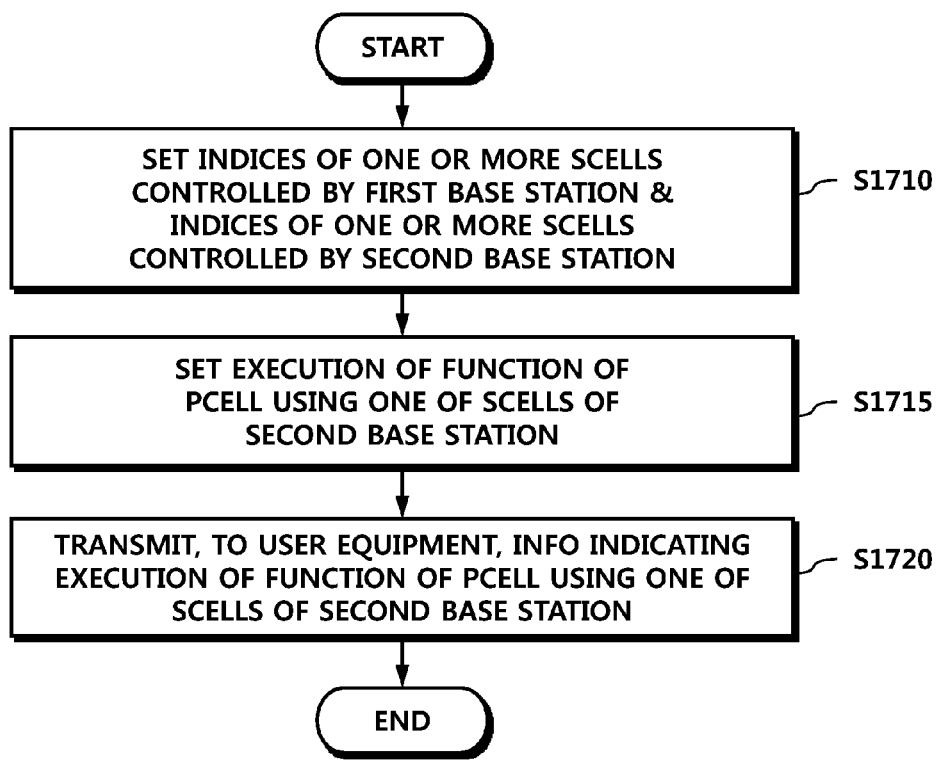
FIG. 17 is a view illustrating a process for controlling an SCell by a base station in a small cell environment according to another embodiment of the present disclosure.

FIG. 17 is a view illustrating a process for controlling an SCell by a BS in a small cell environment according to another embodiment of the present disclosure. A first BS controls a PCell, and a second BS controls an SCell performing a function of the PCell. In step S1710, the first BS sets indices of one or more SCells controlled by the first BS and indices of one or more SCells controlled by the second BS. In step S1715, the first BS sets the execution of the function of the PCell using one of the SCells of the second BS. In step S1720, the first BS transmits, to the UE, information indicating the execution of the function of the PCell using one of the SCells of the second BS.

More specifically, the functions of the PCell may include a function of receiving a PUCCH. In addition, the functions of the Pcell may include a cross-carrier scheduling function, a function of transmitting, by the BS, a random access response message in a non-contention based random access procedure, and the like.

Also, the SCell performing the function of the PCell may be set not to be cross-carrier scheduled.

The SCell indices may be independently set in step S1710 such that an SCell index of the first BS overlaps an SCell index of the second BS, by applying the independent setting scheme in the embodiment C. In a different scheme, the SCell indices may be set in step S1710 without discrimination such that an SCell index of the first BS does not overlap an SCell index of the second BS, by applying the setting scheme without discrimination in the embodiment D.

FIG. 18 to FIG. 21 each illustrates an example of setting an SCell performing a function of a PCell, and each illustrates a method for setting an SCell index without discriminating between a first BS and a second BS according to embodiments.

X-1 to X-4 and Y-1 to Y-4 as described above may be reconfigured as follows. First, when the first BS is a macrocell and the second BS is a small cell, a Pcell and Scell may be configured as M-1 to M-4 according to embodiments. When the first BS is abbreviated and expressed as mac_1 and the second BS is abbreviated and expressed as sma_2, the configurations are as follows.

M-1 {PCell(mac_1), SCell-0(sma_2)}
M-2 {PCell(mac_1), SCell-0(sma_2), SCell-1(mac_1 or sma_2)}
M-3 {PCell(mac_1), SCell-0(mac_1), SCell-1(sma_2), SCell-2(mac_1 or sma_2)}
M-4 {PCell(mac_1), SCell-0(sma_2), SCell-1(mac_1), SCell-2(mac_1 or sma_2)}

Figure 18:
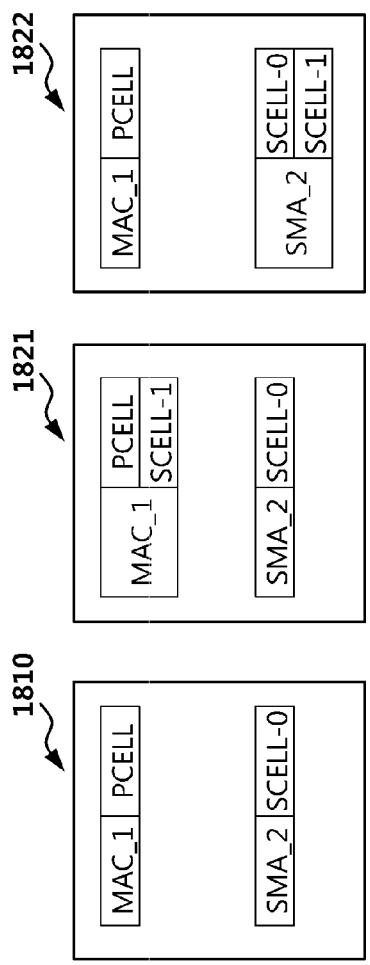
FIG. 18 and FIG. 19 are views each illustrating an example of setting an SCell performing a function of a PCell by applying an embodiment of the present disclosure to M-1 to M-4.
Figure 19:
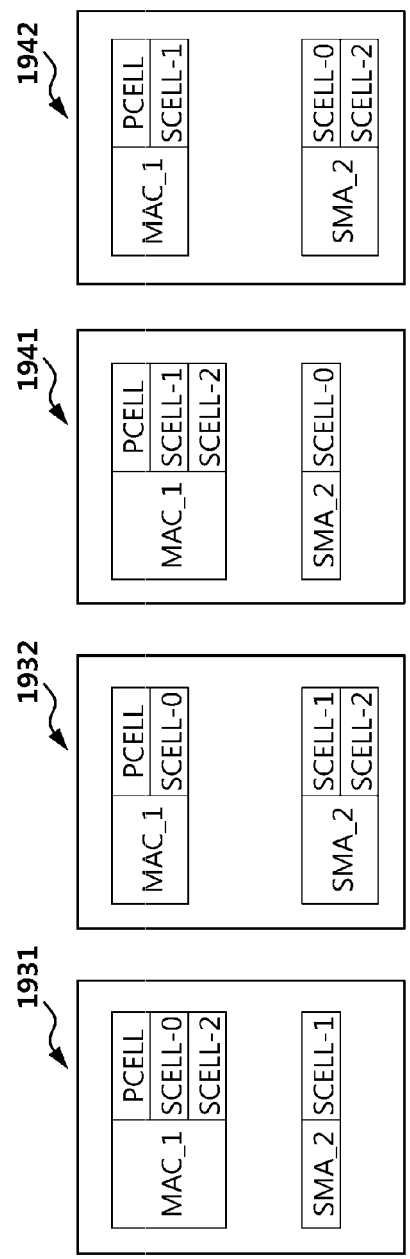

FIG. 18 and FIG. 19 illustrate setting of an SCell performing a function of a PCell by applying M-1 to M-4. FIG. 18 and FIG. 19 illustrate that an SCell index of the SCell performing the function of the PCell corresponds to an SCell having a lowest index. However the embodiments of the present disclosure are not limited thereto. For example, an SCell having a higher index may also be implemented to perform the function of the PCell.

Reference numeral 1810 indicates an embodiment to which configuration M-1 is applied, and an SCell performing the function of the PCell is SCell-0 as indicated by reference numeral 1810.

Reference numeral 1821 indicates an embodiment in which mac_1 corresponds to an SCell controlling SCell-1 in configuration M-2. Reference numeral 1822 indicates an embodiment in which sma_2 corresponds to an SCell controlling SCell-1 in configuration M-2. The SCell performing the function of the PCell is SCell-0 as indicated by reference numerals 1821 and 1822.

Reference numeral 1831 indicates an embodiment in which mac_1 corresponds to an SCell controlling SCell-0 and SCell-2 in configuration M-3. Reference numeral 1832 indicates an embodiment in which sma_2 corresponds to an SCell controlling SCell-1 and SCell-2 in configuration M-3. The SCell performing the function of the PCell is SCell-1 as indicated by reference numerals 1831 and 1832.

Reference numeral 1841 indicates an embodiment in which mac_1 corresponds to an SCell controlling SCell-1 and SCell-2 in configuration M-4. Reference numeral 1842 indicates an embodiment in which sma_2 corresponds to an SCell controlling SCell-0 and SCell-2 in configuration M-4. The SCell performing the function of the PCell is SCell-0 as indicated by reference numerals 1841 and 1842.

Next, when a first BS is a small cell and a second BS is a macrocell, configurations such as N-1 to N-4 may be an embodiment. When the first BS is abbreviated and expressed as sma_1 and the second BS is abbreviated and expressed as mac_2, the configurations are as follows.

N-1 {PCell(sma_1), SCell-0(mac_2)}
N-2 {PCell(sma_1), SCell-0(mac_2), SCell-1(sma_1 or mac_2)}
N-3 {PCell(sma_1), SCell-0(sma_1), SCell-1(mac_2), SCell-2(sma_1 or mac_2)}
N-4 {PCell(sma_1), SCell-0(mac_2), SCell-1(sma_1), SCell-2(sma_1 or mac_2)}

Figure 20:
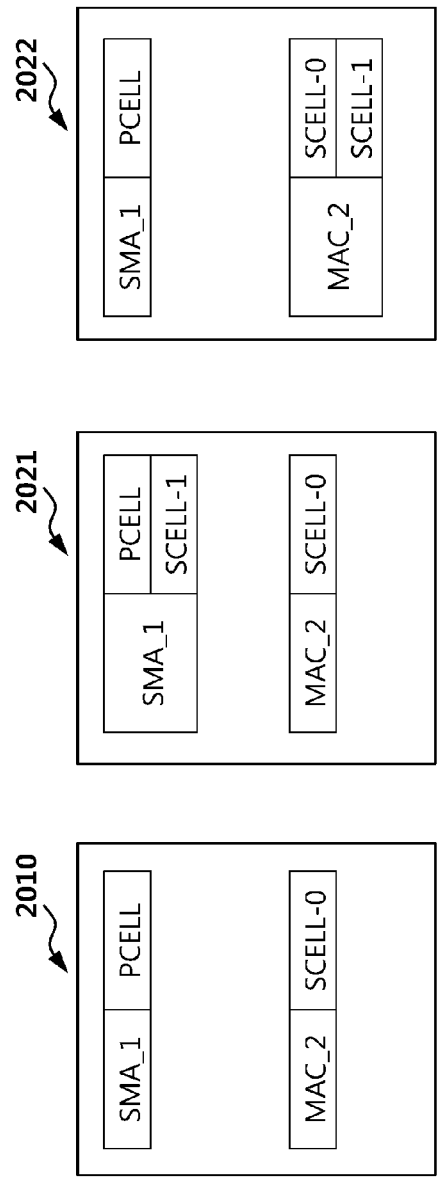
FIG. 20 and FIG. 21 are views each illustrating an example of setting an SCell performing a function of a PCell by applying another embodiment of the present disclosure to N-1 to N-4.
Figure 21:
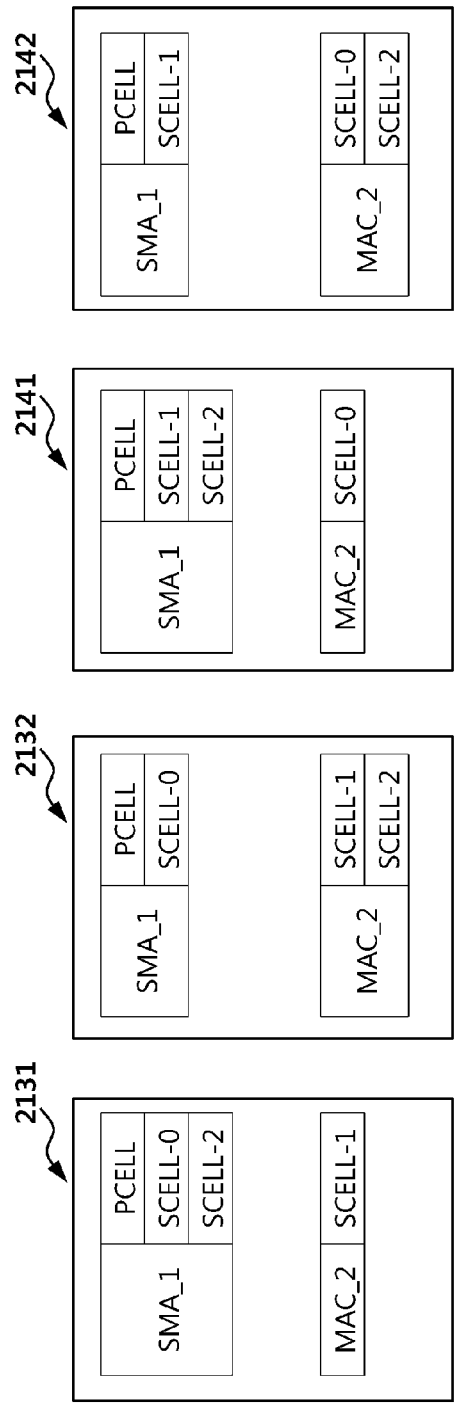

FIG. 20 and FIG. 21 illustrate settings of an SCell performing a function of a PCell by applying N-1 to N-4. FIG. 20 and FIG. 21 illustrate that an SCell index of the SCell performing the function of the PCell corresponds to an SCell having a lowest index. However the embodiments of the present disclosure are not limited thereto, and an SCell having a higher index may also be set to perform the function of the PCell.

Reference numeral 2010 indicates an embodiment to which configuration N-1 is applied, and an SCell performing the function of the PCell is SCell-0 as indicated by reference numeral 2010.

Reference numeral 2021 indicates an embodiment in which sma_1 corresponds to an SCell controlling SCell-1 in configuration N-2. Reference numeral 2022 indicates an embodiment in which mac_2 corresponds to an SCell controlling SCell-1 in configuration N-2. The SCell performing the function of the PCell is SCell-0 as indicated by reference numerals 2021 and 2022.

Reference numeral 2031 indicates an embodiment in which sma_1 corresponds to an SCell controlling SCell-2 in configuration N-3. Reference numeral 2032 indicates an embodiment in which mac_2 corresponds to an SCell controlling SCell-2 in configuration N-3. The SCell performing the function of the PCell is SCell-1 as indicated by reference numerals 2031 and 2032.

Reference numeral 2041 indicates an embodiment in which sma_1 corresponds to an SCell controlling SCell-2 in configuration N-4. Reference numeral 2042 indicates an embodiment in which mac_2 corresponds to an SCell controlling SCell-2 in configuration N-4. The SCell performing the function of the PCell is SCell-0 as indicated by reference numerals 2041 and 2042.

The SCell performing the function of the PCell illustrated in each of FIG. 18 to FIG. 21 may provide a function of receiving a PUCCH. In addition, the Scell may provide a cross-carrier scheduling function or a function of transmitting, by the BS, a random access response message in a non-contention based random access procedure and receiving, by the UE, the random access response message. Also, the SCell performing the function of the PCell may be set not to be capable of being cross-carrier scheduled.

Figure 22:
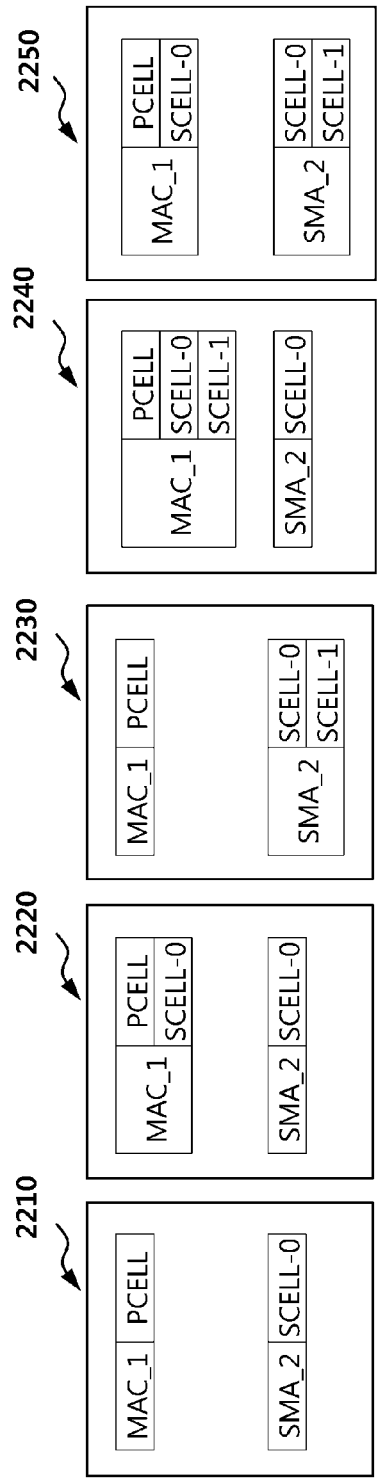
FIG. 22 and FIG. 23 are views each illustrating an embodiment of independently setting an index.
Figure 23:
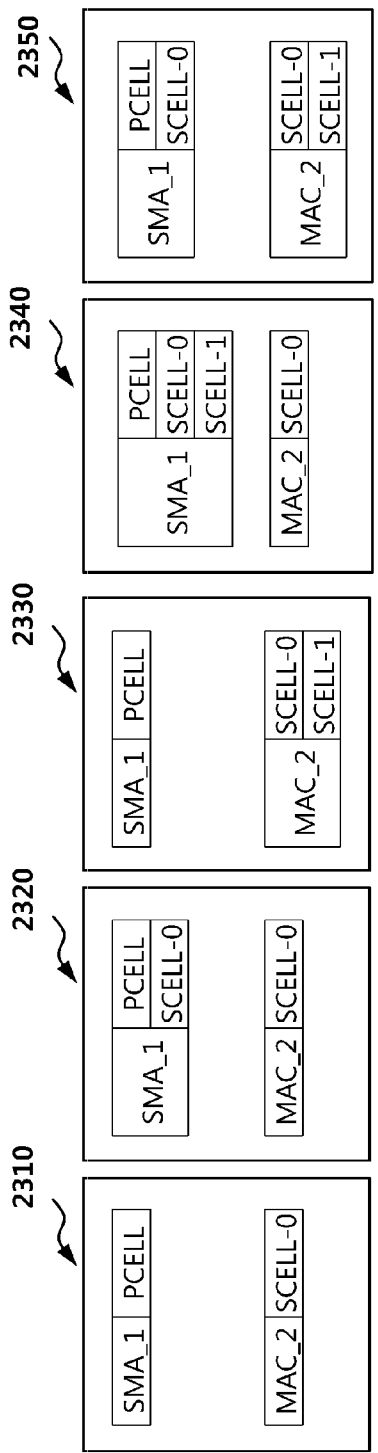

FIG. 18 to FIG. 21 illustrate setting an index of an SCell without discrimination. FIG. 22 and FIG. 23 illustrate that an index is independently set.

X-1 to X-4 and Y-1 to Y-4 as described above may be reconfigured as follows. First, when a first BS is a macrocell and a second BS is a small cell, a Pcell and Scell may be configured as P-1 to P-5 according to embodiments. When the first BS is abbreviated and expressed as mac_1 and the second BS is abbreviated and expressed as sma_2, the configurations are as follows.

P-1 {PCell(mac_1)}, {SCell-0(sma_2)}
P-2 {PCell(mac_1), SCell-0(mac_1)}, {SCell-0(sma_2)}
P-3 {PCell(mac_1)}, {SCell-0(sma_2), SCell-1(sma_2)}
P-4 {PCell(mac_1), SCell-0(mac_1), SCell-1(mac_1)}, {SCell-0(sma_2)}
P-5 {PCell(mac_1), SCell-0(mac_1)}, {SCell-0(sma_2), SCell-1(sma_2)}

Configuration P-1 is proposed as indicated by reference numeral 2210. Here, an SCell performing a function of a PCell is SCell-0(SCell-0(sma_2)) of the second BS. Similarly, configuration P-2 is proposed as indicated by reference numeral 2210, configuration P-3 is proposed as indicated by reference numeral 2230, configuration P-4 is proposed as indicated by reference numeral 2240, and configuration P-5 is proposed as indicated by reference numeral 2250. In each case, an SCell performing the function of the PCell is SCell-0(SCell-0(sma_2)) of the second BS. It goes without saying that an SCell having another SCell index, which is not a lowest SCell index, may be set to perform the function of the PCell.

Next, when a first BS is a small cell and a second BS is a macrocell, a Pcell and Scell may be configured as Q-1 to Q-5 according to embodiments. When the first BS is abbreviated and expressed as sma_1 and the second BS is abbreviated and expressed as mac_2, the configurations are as follows.

Q-1 {PCell(sma_1)}, {SCell-0(mac_2)}
Q-2 {PCell(sma_1), SCell-0(sma_1)}, {SCell-0(mac_2)}
Q-3 {PCell(sma_1)}, {SCell-0(mac_2), SCell-1(mac_2)}
Q-4 {PCell(sma_1), SCell-0(sma_1), SCell-1(sma_1)}, {SCell-0(mac_2)}
Q-5 {PCell(sma_1), SCell-0(sma_1)}, {SCell-0(mac_2), SCell-1(mac_2)}

Configuration Q-1 is proposed as indicated by reference numeral 2310. Here, an SCell performing a function of a PCell is SCell-0(SCell-0(mac_2)) of the second BS. Similarly, configuration Q-2 is proposed as indicated by reference numeral 2310, configuration Q-3 is proposed as indicated by reference numeral 2330, configuration Q-4 is proposed as indicated by reference numeral 2340, and configuration Q-5 is proposed as indicated by reference numeral 2350. In each case, an SCell performing the function of the PCell is SCell-0(SCell-0(mac_2)) of the second BS. It goes without saying that an SCell having another SCell index, which is not a lowest SCell index, may be set to perform the function of the PCell.

When CA is performed by using carriers having the different TDD and FDD modes, and when CA is performed by using carriers supported by different BS types, ambiguity is solved between the UE and the BS regarding an operation of the UE, such as a UL/DL control channel and a UL/DL data channel between the BS and the UE, an access procedure therebetween, and the like, which operates according to the setting of a PCell and an SCell between the UE and the BS, and a setting by the BS. Accordingly, accuracy is achieved for an access procedure, UL/DL data transmission, and an operation of transmission/reception of a UL/DL control channel including an HARQ operation, which are performed between the UE and the BS, and thereby the reliability of data transmission between the UE and the BS can be ensured. As a result, a data transmission rate in UL/DL can be increased.

Also, when CA between BSs of different BS types (i.e., inter-BS CA) and a dual connectivity therebetween are supported, ambiguity is solved between the UE and the BSs regarding an operation of the UE, which operates according to the setting of a PCell and an SCell between the UE and the BSs of the different BS types, and a setting by the BS. Accordingly, accuracy is achieved for an access procedure, UL/DL data transmission, and an operation of transmission/reception of a UL/DL control channel including an HARQ operation, which are performed between the UE and the BSs, and thereby the reliability of the transmission of data by the UE in the case of the UE and the BSs of the different BS types can be ensured. As a result, a data transmission rate in UL/DL can be increased.

Figure 24:
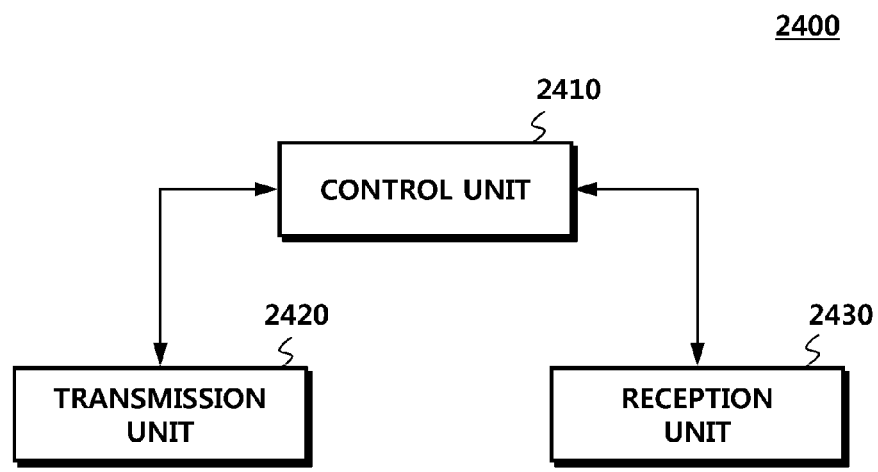
FIG. 24 is a view illustrating a configuration of a user equipment according to another embodiment of the present disclosure.

FIG. 24 is a view illustrating a configuration of a UE according to another embodiment of the present disclosure.

Referring to FIG. 24, the UE 2400 according to another embodiment of the present disclosure includes a reception unit 2430, a control unit 2410, and a transmission unit 2420.

The reception unit 2430 receives DL control information, DL data, and a message through a relevant channel from the BS.

Also, the control unit 2410 controls an overall operation of the UE according to the setting of an SCell which considers a joint operation and CA of FDD and TDD in different duplex modes required to perform the above-described present.

Further, in a method for setting an SCell by the UE required to perform the above-described embodiments of the present disclosure, the control unit 2410 controls an overall operation of the UE for designating a PCell/SCell according to different BS types, which may be applied regardless of a duplex mode when CA, a joint operation, and a dual connectivity are performed in an environment of different macrocell and small cell (or macro eNB and small cell eNB).

The configuration of the UE will be described in more detail below.

The transmission unit 2420 performs transmission in UL to a first BS and/or a second BS, and the reception unit 2430 performs reception in DL from the first BS and/or the second BS. Also, the control unit 2410 receives indices of one or more SCells controlled by the first BS and indices of one or more SCells controlled by the second BS. Thereafter, the control unit 2410 controls the transmission unit 2420 and the reception unit 2430 to perform a function of a PCell by using one of the SCells of the second BS. Here, examples of the function of the PCell include the transmission of a PUCCH by the transmission unit 2420. The function of the PCell according to another embodiment may be a cross-carrier scheduling function, and a function of receiving a random access response message in a non-contention based random access procedure. Also, the SCell performing the function of the PCell may be implemented to be set not to be cross-carrier scheduled.

The control unit 2410 may independently set the SCell indices such that an SCell index of the first BS overlaps an SCell index of the second BS. In contrast, the control unit 2410 may set the SCell indices without discrimination such that an SCell index of the first BS does not overlap an SCell index of the second BS.

Figure 25:
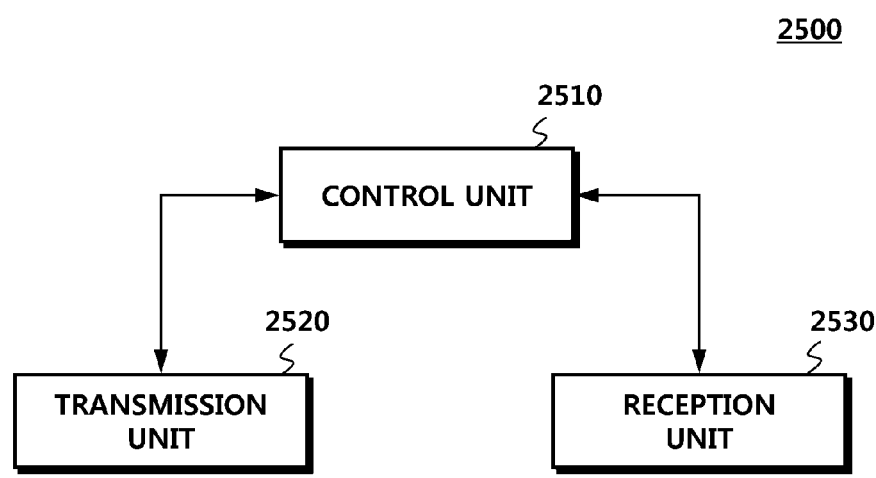
FIG. 25 is a view illustrating a configuration of a base station according to another embodiment of the present disclosure.

FIG. 25 is a view illustrating a configuration of a BS according to another embodiment of the present disclosure.

Referring to FIG. 25, the BS 2500 according to another embodiment of the present disclosure includes a control unit 2510, a transmission unit 2520, and a reception unit 2530.

The control unit 2510 controls an overall operation of the BS according to the setting of an SCell which considers a joint operation and CA of FDD and TDD in different duplex modes required to perform the above-described present.

In a method for setting an SCell by the UE required to perform the above-described embodiments of the present disclosure, the control unit 2510 controls an overall operation of the BS for designating a PCell/SCell according to different BS types, which may be applied regardless of a duplex mode when CA, a joint operation, and a dual connectivity are performed in an environment of different macrocell and small cell (or macro eNB and small cell eNB).

The transmission unit 2520 and the reception unit 2530 are used to transmit and receive signals, messages, and data, which are required to perform the above-described present, to/from the UE.

The transmission unit 2520 transmits DL control information, DL data, and a message through a relevant channel to the UE.

The configuration of the BS will be described in more detail below.

The transmission unit 2520 performs transmission in DL to the UE, and the reception unit 2530 performs reception in UL from the UE. Also, the control unit 2510 sets indices of one or more SCells controlled by the BS and indices of one or more SCells controlled by a second BS distinguished from the BS. The control unit 2510 sets the execution of a function of a PCell using one of the SCells of the second BS. Thereafter, the control unit 2510 may control the transmission unit 2520 and the reception unit 2530 to transmit information, which indicates the execution of the function of the PCell using one of the SCells of the second BS, to the UE.

According to another embodiment, the function of the PCell is the reception of a PUCCH by the reception unit 2530. According to further another embodiment, the function of the PCell may include one or more of a cross-carrier scheduling function and a function of transmitting a random access response message in a non-contention based random access procedure. Meanwhile, the control unit 2510 may set the SCell performing the function of the PCell not to be cross-carrier scheduled.

The control unit 2510 may independently set the SCell indices such that an SCell index of the BS 2500 overlaps an SCell index of the second BS. In contrast, the control unit 2510 may set the SCell indices without discrimination such that an SCell index of the BS 2500 does not overlap an SCell index of the second BS.

The above-described embodiments in this specification provide the operating method and the apparatus of the BS and the operating method and the apparatus of the UE, which set an SCell when the BS considers a joint operation and CA of FDD and TDD, which are different duplex modes, with respect to the UE.

Also, according to another embodiment of the present disclosure, the method is provided for enabling the UE to independently set respective SCell indices for each of the FDD and TDD modes or for enabling the UE to set the SCell index on the basis of a configuration of a carrier regardless of the FDD and TDD modes in the case of a joint operation and CA of FDD and TDD which are duplex modes.

Further, in a method for setting an SCell by the UE according to another embodiment of the present disclosure, the method and the apparatus are provided for designating a PCell/SCell according to different BS types, which may be applied regardless of a duplex mode when CA, a joint operation, and a dual connectivity are performed in an environment of different macrocell and small cell (or macro eNB and small cell eNB).

The above description is only an illustrative description of the technical idea of the present disclosure, and those having ordinary knowledge in the technical field, to which the present disclosure pertains, will appreciate that various modifications and changes in form are possible without departing from the essential features of the present disclosure. Therefore, the embodiments disclosed in the present disclosure are intended not to limit but to describe the technical idea of the present disclosure, and thus do not limit the scope of the technical idea of the present disclosure. The protection scope of the present disclosure should be construed based on the appended claims, and all of the technical ideas included within the scope equivalent to the appended claims should be construed as being included within the right scope of the present disclosure.

The invention claimed is:

1. A method for performing carrier aggregation by a user equipment, the method comprising:
  receiving indices of one or more secondary cells (SCells) controlled by a first base station and indices of one or more secondary cells controlled by a second base station; and
  performing a function of a primary cell (PCell) by using one of the secondary cells of the second base station,
  wherein the one secondary cell performing the function of the primary cell is set not to be cross-carrier scheduled; and
  wherein the function of the primary cell includes a cross-carrier scheduling function.

2. The method as claimed in claim 1, wherein the function of the PCell includes a function of transmitting a Physical Uplink Control CHannel (PUCCH).

3. The method as claimed in claim 1, wherein the function of the primary cell further comprises a function of receiving a random access response message in a non-contention based random access procedure.

4. The method as claimed in claim 1, wherein the receiving of the indices of the one or more secondary cells comprises independently setting the secondary cell index of the first base station and the secondary cell index of the second base station such that at least one same index value is assigned as the secondary cell index of the first base station and the secondary cell index of the second base station.

5. The method as claimed in claim 1, wherein the receiving of the indices of the one or more secondary cells comprises setting the secondary cell index of the first base station and the secondary cell index of the second base station such that at least one same index value is not assigned as the secondary cell index of the first base station and the secondary cell index of the second base station.

6. A method for performing carrier aggregation by a user equipment, the method comprising:
  receiving, from a base station, information which sets, as a first secondary cell(SCell), a carrier of a second duplex mode different from a first duplex mode of a primary cell (PCell) on which the user equipment accesses the base station in different duplex modes; and performing, by the user equipment, a function of the Pcell with the base station, by using the first secondary cell, wherein the first secondary cell performing the function of the PCell is set not to be cross-carrier scheduled; and wherein the function of the PCell includes a cross-carrier scheduling.

7. The method as claimed in claim 6, wherein the function of the PCell further comprises one or more of transmission/reception of a Physical Uplink Control CHannel (PUCCH), and transmission/reception of a random access response.

8. The method as claimed in claim 6, wherein the first secondary cell is self-carrier scheduled.

9. The method as claimed in claim 6, wherein the first secondary cell is set as a secondary cell having a lowest cell index among secondary cells of the second duplex mode.

10. The method as claimed in claim 6, wherein indices of one or more secondary cells of the first duplex mode and indices of one or more secondary cells of the second duplex mode are independently set.

11. The method as claimed in claim 6, wherein indices of one or more secondary cells of the first duplex mode and indices of one or more secondary cells of the second duplex mode are set such that at least one same index value is not assigned as the indices of the one or more secondary cells of the first duplex mode and the indices of the one or more secondary cells of the second duplex mode.

12. The method as claimed in claim 6, further comprising setting one carrier of the second duplex mode as a second primary cell distinguished from the primary cell, and setting one carrier of the first duplex mode as a second secondary cell distinguished from the first secondary cell.

* * * * *